(12) United States Patent
Aylward et al.

(10) Patent No.: US 7,324,264 B2
(45) Date of Patent: Jan. 29, 2008

(54) ELECTRO-OPTICAL MODULATING DISPLAY AND METHOD OF MAKING THE SAME

(75) Inventors: Peter T. Aylward, Hilton, NY (US); Thomas M. Smith, Spencerport, NY (US); Leonard S. Gates, Holley, NY (US); Daniel A. Slater, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 17 days.

(21) Appl. No.: 11/360,902

(22) Filed: Feb. 23, 2006

(65) Prior Publication Data

US 2007/0195057 A1    Aug. 23, 2007

(51) Int. Cl.
*G02B 26/00* (2006.01)
*G09G 3/34* (2006.01)
*G02F 1/01* (2006.01)

(52) U.S. Cl. .................. 359/296; 359/245; 345/107; 347/106; 340/815.54; 313/582; 313/583; 313/484; 374/158; 430/37; 430/311; 430/329

(58) Field of Classification Search ............... 359/296, 359/245, 252–254; 345/88, 107, 105; 374/158; 313/582–587, 484, 495, 607, 185 S; 340/815.54; 347/106; 348/740, 744, 801, E3.012, E3.016; 349/85, 89, 155, 187; 355/402, 403; 430/32, 430/37, 311, 329
See application file for complete search history.

(56) References Cited

U.S. PATENT DOCUMENTS

| | | | |
|---|---|---|---|
| 3,210,757 A * | 10/1965 | Jacob .................... 340/815.54 |
| 6,577,433 B1 * | 6/2003 | Lin et al. ..................... 359/296 |
| 6,831,770 B2 | 12/2004 | Liang et al. ................. 359/296 |
| 6,850,355 B2 * | 2/2005 | Liang et al. ................. 359/296 |
| 6,859,302 B2 * | 2/2005 | Liang et al. ................. 359/296 |
| 6,865,012 B2 * | 3/2005 | Liang et al. ................. 359/296 |
| 6,867,898 B2 * | 3/2005 | Liang et al. ................. 359/296 |
| 6,940,634 B2 | 9/2005 | Ukigaya .................... 359/296 |
| 7,112,114 B2 * | 9/2006 | Liang et al. ................... 445/24 |
| 7,113,323 B2 * | 9/2006 | Ho et al. ..................... 359/296 |
| 7,158,282 B2 * | 1/2007 | Liang et al. ................. 359/296 |
| 2005/0122565 A1 | 6/2005 | Doshi et al. ................. 359/296 |
| 2005/0133154 A1 | 6/2005 | Daniel et al. ................ 156/292 |

* cited by examiner

*Primary Examiner*—Loha Ben
(74) *Attorney, Agent, or Firm*—Chris P. Konkol

(57) ABSTRACT

This invention relates to a method of manufacturing microcell arrays. Such an array may find use in a number of applications such as, for example, a video display, electronic paper, and signage. The microcell arrays find particular use in electromodulating displays.

42 Claims, 16 Drawing Sheets

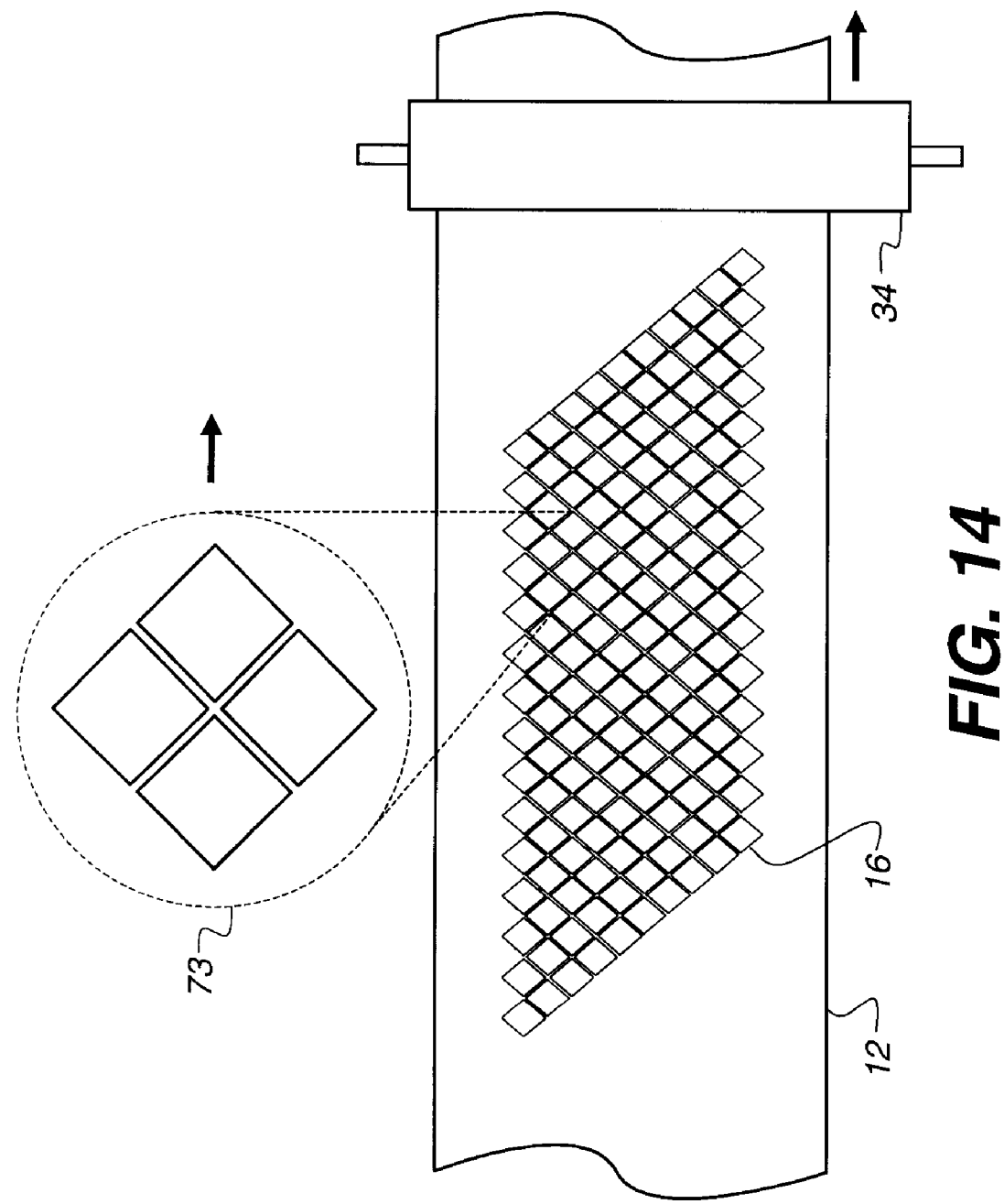

ELECTRO-OPTICAL MODULATING DISPLAY AND METHOD OF MAKING THE SAME

FIELD OF THE INVENTION

The present invention relates generally to the field of electro-optical modulating displays, for example, electrophoretic displays and, specifically, to a novel method of manufacturing such displays. In particular, the invention relates to novel electro-optical modulating display structure and methods of sealing liquid-based imaging material in microcells associated with such electro-optical modulating displays.

BACKGROUND OF THE INVENTION

The electrophoretic display offers an electronic alternative to conventional printed-paper media for many applications. The electrophoresis phenomenon is based on charged particles suspended in a liquid fluid, for example charged pigment particles in an organic solvent. Unlike sheet materials containing magnetic memory areas that can be written electronically, an electrophoretic display advantageously provides a visible record for the viewer.

Electrophoretic media systems exist that maintain electronically changeable data without power, such as devices available from E-ink Corporation, Cambridge, Mass., or GYRICON systems from Xerox Corporation, Stamford, Conn.

As initially proposed in the late 1960's, the electrophoretic display typically comprises two plates with electrodes placed opposing each other, separated by spacers. One of the electrodes, for placement nearer to the viewer, is usually transparent. In one prior-art embodiment, a fluid suspension composed of a colored solvent and charged pigment particles is enclosed between the two plates. When a voltage difference is imposed between the two electrodes, the pigment particles migrate to one side, such that either the color of the pigment or the color of the solvent is predominant, depending on the polarity of the voltage difference.

Since the inception of this technology, there has been considerable research directed to its implementation and optimization. For example, in order to prevent undesired movement of the particles, such as sedimentation or lateral migration, partitions between the two electrodes were proposed for dividing the space into smaller cells. However, in the case of partition-type electrophoretic displays, difficulties were encountered in the formation of the partitions, in the process of enclosing the fluid suspension, and in the case of colored displays, in segregating different colored fluid suspensions from each other in partition-type electrophoretic displays.

Partitioning electrophoretic displays into smaller cells has been accomplished by a photolithographic process. This is a batchwise process requiring solvent development step. However, it is desirable to be able to manufacture electrophoretic displays without requiring a solvent development step, and there is a need for an improved processing method that provides high throughput, especially a continuous process.

Roll-to-roll microembossing processing has been proposed as an alternate fabrication method for cell formation in an electrophoretic display. For example, U.S. Pat. No. 6,831,770 B2 entitled "Electrophoretic Display and Novel Process for its Manufacture" to Liang et al. discloses an electrophoretic display comprising microcells, termed microcups, that are filled with charged particles dispersed in a solvent, wherein each cell is individually sealed with its own polymeric sealing layer or cap. The polymeric seal in each microcup is obtained by adding a separate sealing composition to each individual microcup along with the charged pigment dispersion comprising pigment particles. The sealing composition can be thoroughly blended with the electrophoretic fluid containing charged pigment particles dispersed in a colored dielectric solvent. For example, an in-line mixer or other blending apparatus can be used to mix the two materials. Then, the mixture can be immediately coated onto a sheet having microcups, using a precision coating mechanism such as Myrad bar, gravure, doctor blade, slot coating or slit coating. Notably, the sealing composition is immiscible or otherwise incompatible with the solvent and has a lower specific gravity than the solvent and pigment particles. The sealing composition in each microcup forms a supernatant layer, on top of the charged pigment dispersion, that is hardened using radiation, heat, moisture, or some other means in order to form the seal. In this way, each microcup becomes a separately sealed container with an electrophoretic fluid mixture. The process described by Liang et al. can be, for example, a continuous roll-to-roll process, as shown in FIG. 6 of the afore-mentioned U.S. Pat. No. 6,831,770 B2.

Thus, the method of the Liang et al. involves individually sealing the microcup cells, that is, the sealing layer for each microcup can be formed as an individual seal that is discontinuous with the sealing layer for each of the surrounding microcups in an array of microcups, and a common sealing layer does not seal a plurality of microcups. Once the microcups are individually sealed, only then is a lamination sheet applied over the microcups, wherein the lamination sheet is a second conductor film pre-coated with an adhesive layer.

In an alternate embodiment disclosed by Liang et al. in U.S. Pat. No. 6,831,770 B2, a sealing layer can be formed by overcoating the microcups, once filled with electrophoretic fluid, with a thin layer of a sealing composition. Liang et al. state that the sealing layer may extend over the top surface of the cell side walls (FIG. 8), thereby forming a stopper-shaped sealing layer having a thickness ranging from about 0.1 μ to about 50 μm, in which the cell is only partially filled with the electrophoretic fluid. The thickness of the sealing layer below the top surface of the partition walls and above the interface is at least 0.01 μm above the interface. It is preferred that the sealing layer forms a contiguous film above the cell walls and the electrophoretic fluid. Liang et al. state that the cell is sandwiched between two conductive layers and that there may be an additional adhesive layer between the top of the sealing layer and the top conductive layer.

Thus, in the top-sealing process of Liang et al., the display fluid is enclosed and top-sealed before a second substrate or electrode layer is disposed or laminated onto the display cells. Also, the seal must be formed with a lower density material. Among the problems with this type of sealing arrangement are difficulties in preventing or minimizing the degree of intermixing between the sealing composition and the pigment dispersion. Also, it is difficult to adjust the thickness of the seal, which needs to be much less than that of the electrophoretic fluid in order to provide the necessary optical density. Consequently, the specific gravity and viscosity of the materials must be carefully controlled, which limits the materials that can be used. Volatile solvents and fluorinated compounds may be used to adjust properties such as the viscosity and the thickness of the coatings. However, this adds complexity and further steps to the fabrication process.

U.S. Pat. No. 6,940,634 entitled "Electrophoretic Display Device" to Ukigaya describes the prior-art manufacture of an electrophoretic display device by adhering a substrate and a microcell sheet together through an adhesive layer, wherein the top surfaces of the microcell walls are adhered to the substrate (see column 1). Ukigaya states that production steps and apparatus for forming the adhesive layer are complicated and can cause yield reductions or increased production costs. As a solution, Ukigaya proposes using an electrode having adhesive properties. An adhesive electroconductive resin is applied between the partition wall of a microcell and a protective substrate, in order both to eliminate the prior-art adhesive layer and to provide electrical connections to each cell. This type of approach may prove useful for some types of electrophoretic cell design, but would offer no advantage for an in-plane electrode design, in which all electrodes lie in the same plane within the electrophoretic cell. Also, the requirement for electrical conductivity of the adhesive significantly narrows the choices of adhesive material available, and steps taken to provide or enhance resin conductivity using metallic powders or other particulates could cause disadvantageous optical effects in the display.

In yet another prior-art approach, U.S. Patent Application Publication No. 2005/0122565 A1 entitled "Electrophoretic Displays and Materials for Use Therein" by Doshi et al. discloses an adhesive layer disposed between the first and second substrate of an electro-optical display. Doshi et al. disclose, in forming the final display, laminating a first substrate having s a layer of encapsulated electrophoretic medium (capsules in a binder) to a second substrate, a backplane, using a lamination adhesive (paragraph 0018). Doshi et al. state that such a process allows for mass production of displays by roll lamination. However, in this process, the electrophoretic medium is first dried to form a coherent layer of the electrophoretic medium firmly adhered to the first substrate before the lamination step. Doshi et al. also state that similar manufacturing techniques can be used with other types of electro-optic displays. For example, a microcell electrophoretic medium may be laminated to a backplane. However, Doshi et al. do not describe how to laminate a backplane to an unsealed microcell sheet containing a flowable liquid fluid as compared to a dried, coherent layer. Doshi et al. also disclose the use of vacuum lamination; however, this would be inappropriate with liquid or other materials that are not already bonded to an underlying substrate in some way.

U.S. Patent Publication No. 2005/0133154 entitled "Method of Sealing an Array of Cell Microstructures Using Microencapsulated Adhesive" to Daniel et al. states that one known method of sealing microcells involves providing a wall microstructure on a first flexible substrate, coating a second flexible substrate with a substantially continuous layer of adhesive or sealant, and positioning the second flexible substrate on the end portion of the wall microstructure (apparently the top surface of the side walls) to effectively seal the microcells. Daniel et al., however, point out disadvantages of applying a continuous layer of adhesive onto a substrate for bonding to cell walls for sealing the electrophoretic microcells. Notably, excess liquid adhesive that is not used in forming the bond with the wall microstructure of the microcells tends to migrate into or otherwise intermix with the contents of the cells. This unwanted mixing can undesirably affect properties of the electrophoretic substance contained within the cells. To overcome this problem, Daniel et al. disclose a method of sealing an array of cell microstructures using a microencapsulated adhesive. In one particular embodiment (as shown in FIG. 3 of the Daniel et al. disclosure), a second substrate having a plurality of adhesive microcapsules supported on a first side of the second substrate is displaced against portions of the cell microstructure on a first substrate. As the second substrate approaches the wall microstructure, a portion of the microcapsules are compressively captured between opposing contact points and rupture, thereby locally dispensing the adhesive contained therein. Consequently, each individual cell is substantially sealed by a locally released adhesive substance and any remaining adhesive microcapsules simply remain, sealed and trapped within the fully enclosed and sealed cells. With this type of approach, care must be taken to distribute the microcapsules suitably for obtaining sufficient levels of localized adhesion. Of course, for using such an approach, the microcapsules themselves must be fabricated from materials and in shapes that are compatible with the light-handling requirements of the electrophoretic device. Cell walls themselves must allow sufficient compression force to break open the compressively captured portion of the microcapsules for sealing. Thus, while this type of approach may prove useful for some cell sealing applications, there are drawbacks and limitations to such a solution for the broad range of electrophoretic and other electro-optical modulating image-forming applications.

In view of the above, conventional approaches for sealing an array of microcells in an electro-optical modulating display have not provided solutions that are sufficiently adaptable and robust for large-scale production. Among the problems that have not been adequately addressed are difficulties due to the composition of the electrophoretic fluid itself. Many of the liquids and solvents used can even prove inimical to conventional surface adhesion materials and techniques or, at best, allow only marginal performance. Self-capping approaches such as those taught by Liang et al. and elsewhere place constraints on both the electrophoretic composition and on the sealing materials themselves. The adhesive electrode taught in the Ukigaya disclosure allows only a narrow range of materials and is not appropriate for designs using an in-plane electrode layout. The method of Doshi et al., involving lamination, may be suitable for electrophoretic composite materials that are not fluid in nature, but do not satisfy the more demanding requirements posed by microcells containing a liquid electrophoretic medium. Finally, adhesive capsules as proposed by Daniel et al. allows only a narrow range of adhesives, may pose limitations due to cost and suitability for mass manufacture, and may result in a residue of material in the microcells that can adversely effect optical performance.

Still another problem with sealing an array of microcells, particularly when simultaneously laminating and sealing an array of liquid-containing microcells is to prevent or limit the entrapment of any air while sealing the microcells, since air bubbles formed in sealed microcells will result in undesirable variations in image density among the microcells.

Problem to be Solved by the Invention

Thus, there is a need for improved methods of sealing liquid-containing microcells in electro-optical modulating displays, which methods are adaptable to high-volume manufacturing environments that require high yields, greatly reduce the constraints on the applicable materials that can be used in carrying out the method, and result in few or no adverse affects on image quality. There is also a need for structures for electro-optical displays that are simpler and more economical to manufacture without sacrificing imaging performance or durability.

SUMMARY OF THE INVENTION

The present invention is directed to overcoming one or more of the problems set forth above. One aspect of the present invention relates to a method of manufacturing a microcell array for use in various electro-optical modulating displays, including electrophoretic displays. Such microcell arrays may find use in a number of applications such as, for example, video displays, electronic paper and signs. Briefly summarized, the present invention relates to a method of making an electro-optical modulating display device, or a manufacturing component thereof, comprising:

(a) providing a first elongated sheet, optionally a continuous web, comprising an array of microcell reservoirs, an outer width of which is in the same direction as outer width of the first elongated sheet, each microcell reservoir being no longer than 1000 μm along any dimension thereof, each microcell reservoir formed by side walls extending vertically from a lower substrate and containing an electro-optical imaging fluid that comprises charged particles dispersed in a carrier fluid, the first elongated sheet optionally comprising a boundary area between the outer width of the array of microcells and the outer width of the first elongated sheet;

(b) providing a second elongated sheet, optionally a continuous web, comprising a substrate layer and an adhesive layer, wherein at least one of the first elongated sheet and second elongated sheet comprises patterned electrodes for addressing the microcells in the array, which electrodes may be transparent;

(c) providing a nip formed between first and second rollers, wherein at least one of the first and second rollers is heated; and (d) laminating the first elongated sheet to the second elongated sheet by simultaneously transporting the first and second elongated sheets along their length in a lamination direction into the nip between the first and second rollers, wherein the second elongated sheet is positioned between the second roller and the first elongated sheet;

whereby the adhesive layer of the first elongated sheet is contacted with at least the tops of the side walls of the microcell reservoirs in the array, and the first elongated sheet is compressed against the second elongated sheet in the nip while the adhesive layer is held at an elevated temperature, thereby commonly sealing the microcell reservoirs in the array to form a sealed array of microcells;

wherein during lamination a bead of excess fluid, the electro-optical imaging fluid from the microcell reservoirs, is formed substantially in a line along the width of the array of microcells, between the first elongated sheet and the second elongated sheet, adjacent the nip and behind the nip relative to the lamination direction; and wherein the bead of excess fluid is allowed to flow widthwise beyond the boundary of the array of microcells in the first elongated sheet, thereby preventing the entrapment of air in the microcell reservoirs as they are sealed by the second elongated sheet during lamination.

In one embodiment of the invention, in order to better control the rolling bead effect, associated with the advancing line of microcells being sealed, the sealing of the microcells along the advancing line, in the first sheet, is accomplished essentially simultaneously with sealing the second sheet, along its sides, to the top surface of the first sheet within respective side boundary areas of the first sheet. The second sheet thereby forms a cover spanning and, in combination with the first sheet, enclosing the microcell array having passed through the nip and approximately up to the line of microcells sealed in the lamination direction.

The microcells on the first sheet can be divided, in the machine or lamination direction, into separate arrays corresponding to separate displays, by a space between the separate arrays. Optionally, in a separate step, for example, by a stamping machine, the first and second sheets can be sealed together along a line within this space to fully enclose an array of filled microcells.

The simultaneous sealing of the microcells and the side edges is advantageous for controlling or preventing excessive lateral spread of the excess electro-optical imaging fluid along the rolling bead. The simultaneous sealing or closure of the side edges causes sufficient electro-optical imaging fluid to move in the machine direction versus the side direction and contributes to fill uniformity. Thus, the microcells being sealed are uniformly filled with sufficient electro-optical imaging fluid. In a particularly preferred embodiment, the first sheet comprises, on each side thereof of, in parallel, a boundary area between the outer boundary of the array of microcells and the outer edge of the first sheet; so that the second sheet entering the nip extends widthwise beyond the array of microcells and within the boundary area of the first sheet, and the outer edges of the second sheet are bonded to the first sheet in the boundary area simultaneously with the sealing of the array of microcells during lamination. The first sheet can comprise patterned electrodes and, along the edge of the boundary areas, contacts for the patterned electrodes, in which case the edges of the second sheet preferably does not extend as far as the contacts, and the contacts are left uncovered by the second sheet when the sides of the second sheet are bonded to the first sheet in the boundary area during lamination.

Another aspect of the present invention relates to an electro-optical modulating display comprising an array of microcells each sealingly filled with an electro-optical imaging fluid, comprising:

(a) a first sheet comprising an array of microcell reservoirs, each microcell reservoir being no longer than 1000 μm along any dimension thereof, each microcell reservoir formed by side walls extending vertically from a lower substrate and containing an electro-optical imaging fluid that comprises charged particles dispersed in a carrier fluid, wherein the microcell reservoirs in the array extend along two dimensions, with a boundary area peripheral to the array of microcell reservoirs, on at least two sides, between a first outer dimension of the array of microcells and a second outer dimension of the first sheet, the first sheet further comprising at least one patterned element having optical or electrical functionality associated with individual microcells of the array;

(b) an integral second sheet laminated to the first sheet and comprising an adhesive layer over a support, the integral second sheet simultaneously:

(i) sealing each of the microcell reservoirs in the array, in which the adhesive layer adhesively bonds to the tops of the side walls of each microcell reservoir in the array, thereby forming an array of microcells, each of which are sealed; and (ii) sealing side portions of the second sheet to side portions of the first sheet within the boundary areas of the first sheet; and (c) an electrical driver for providing control of electrical switching of the optical state of the electro-optical fluid in each microcell in the array of microcells.

The patterned element having optical or electrical functionality associated with individual microcells of the array can comprise a mask, to hide charged particles in the electro-optical fluid, thereby enhancing contrast. The patterned element can also comprise bus bars, collector electrodes, gate electrodes, flag electrodes, and/or electrode pad areas. Suitably the patterned element is positioned in regions all or partially under the array of microcell reservoirs of the first sheet.

Yet another aspect of the present invention relates to a an electro-optical display comprising an array of microcells sealingly filled with an electro-optical imaging fluid that comprises charged particles dispersed in a carrier fluid that is a transparent or colored organic dielectric fluid comprising a long chain hydrocarbon or paraffin, optionally halogenated, in which an integral second sheet is laminated to a first sheet, which integral second sheet comprises an adhesive layer over a support, the integral second sheet sealing each of the filled microcell reservoirs in the array by the adhesive layer adhesively bonding to the tops of the side walls of each microcell reservoir in the array, wherein the adhesive layer comprises a non-ionic polymeric material that is substantially insoluble in said organic dielectric fluid and capable of bonding the integral second sheet to the top of the side walls of the microcell reservoirs even when covered or wetted with the organic dielectric fluid. This adhesive material is particularly advantageous when electro-optical display has been manufactured by a method involving sealing microcells containing a slight excess of carrier fluid to prevent bubble entrapment during sealing, causing the wetting of the tops of the side walls with the dielectric fluid. A superior adhesive material for achieving this purpose is a polyester-type thermoplastic polyurethane (TPU) or an amorphous or semi-crystalline copolyester resin.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 14 is a top view of a microcell sheet in which the microcells are oriented at an angle to the lamination direction.

To facilitate understanding, identical reference numerals have been used, where possible, to designate identical elements that are common to the figures.

DETAILED DESCRIPTION OF THE INVENTION

As indicated above, the present invention is directed to a method of manufacturing an array of microcells. In one embodiment, the present invention relates to a method of making a display device comprising a substrate or support, a patterned conductor, and an electro-optical imaging fluid. The electro-optical imaging fluid used in the present invention is a light modulated liquid fluid, and can be reflective or transmissive. Such light modulating fluid materials can be electrochemical, electrophoretic, or electrochromic, or may comprise particles such as GYRICON particles or liquid crystals. The preferred light-modulating fluid for an imaging layer comprises an electrophoretic material.

For the imaging device made by the present invention, a preferably flexible support substrate bears an electrically modulated imaging layer over at least one surface. As used herein, the terms "over," "above," "on," "under," and the like, with respect to layers in the display element, refer to the order of the layers over the support, but do not necessarily indicate that the layers are immediately adjacent or that there are no intermediate layers. The term "front," "upper," and the like refer to the side of the display element closer to the side being viewed during use.

For the description of the present invention that follows, drawings are provided to illustrate key concepts, processes, and relationships. It must be noted that structures in these drawings are not drawn with attention to scale, but rather to show key structural components and functional relationships more clearly.

Figure 1A:
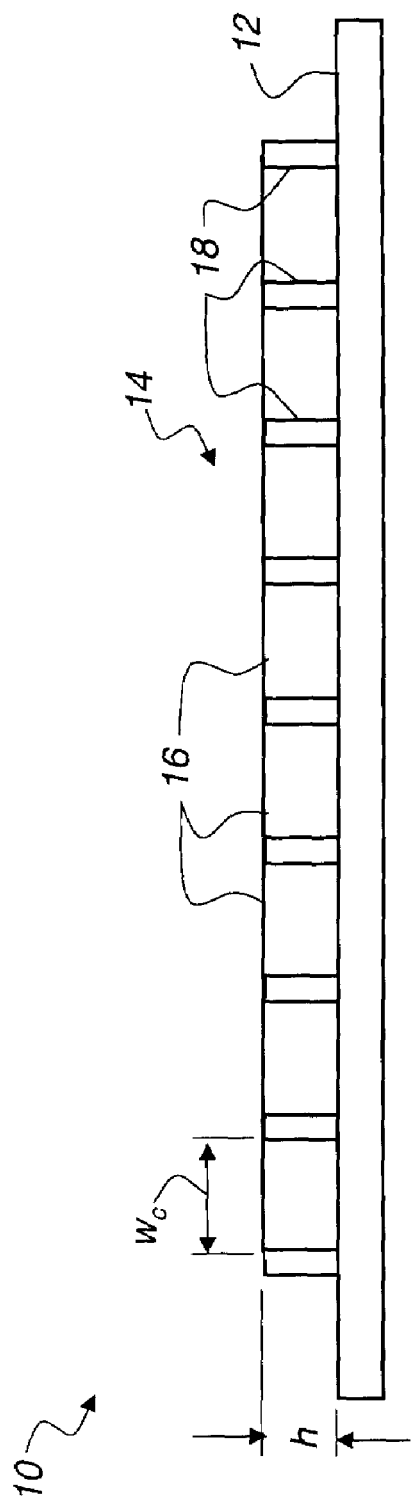
FIG. 1A is a cross-sectional side view of a portion of an electrophoretic display device during one stage of fabrication.
Figure 1B:
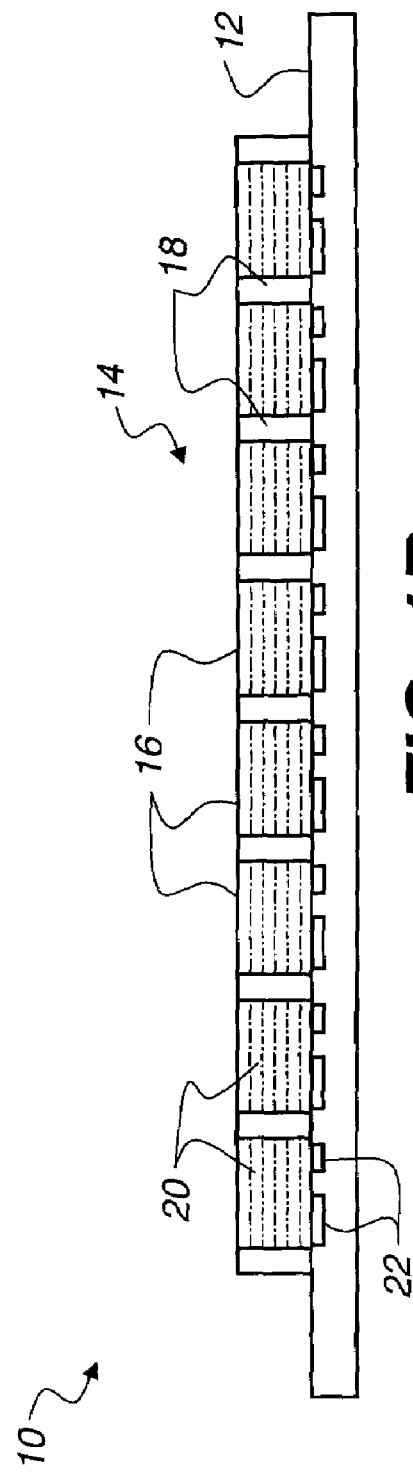
FIG. 1B is a cross-sectional side view of a portion of an electrophoretic display device in which microcells are filled with electrophoretic liquid.
Figure 1C:
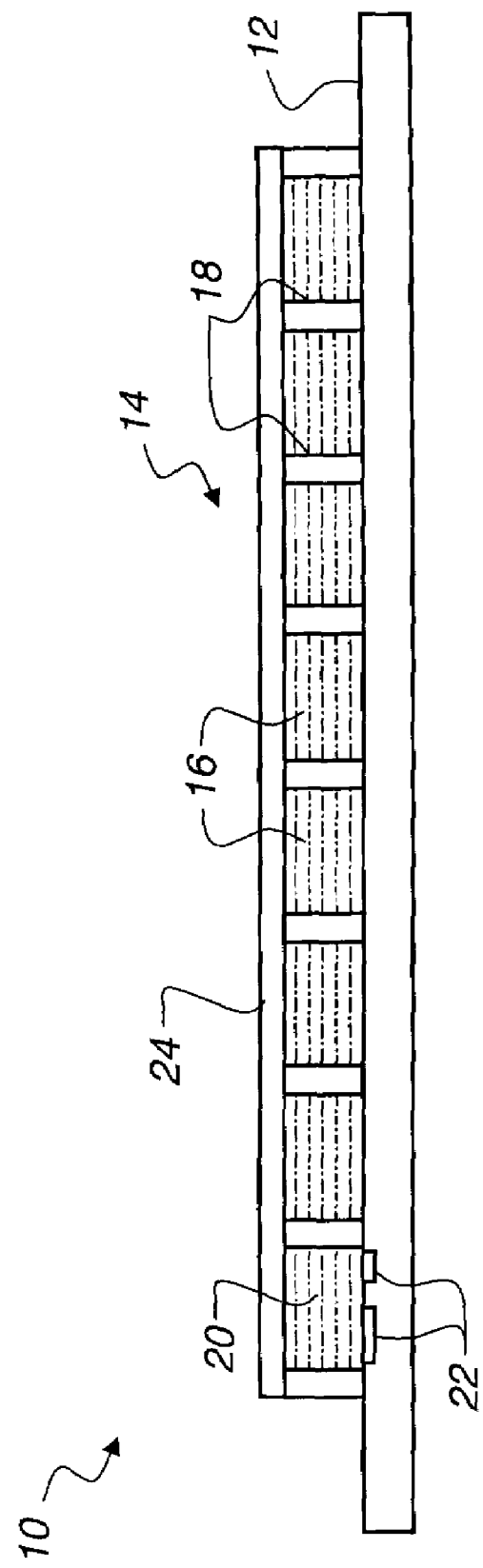
FIG. 1C is a cross-sectional side view of a portion of an idealized electrophoretic display device that has been sealed for use.

The cross-sectional views of FIGS. 1A, 1B, and 1C show, in simplified form, the basic sequence of steps for fabrication and sealing of a display device 10, such as an electrophoretic display, according to the present invention. FIG. 1A shows a single row of microcell reservoirs 16, unfilled, in cross-section. A support sheet 12 is provided, typically on a flexible substrate such as plastic or glass. An array 14 of microcell reservoirs 16 is formed onto support sheet 12 by forming walls 18 on the surface of support sheet 12. Walls 18 may be formed in any of a number of ways, including microembossing, extrusion roll molding, inkjet deposition, or photoresist methods, for example. Walls 18 can be formed from an epoxy or thermoset or similar material, for example. Microcell reservoirs 16 have a height h and cell width $w_c$ as shown in FIG. 1A and may have a length l normal to the page (not visible in the view of FIG. 1A). Preferably, microcell reservoir 16 is no longer than 1000 µm, preferably 100 to 1000, more preferably 200 to 600 µm, along any dimension thereof. Microcell reservoirs 16 can be symmetrical or non-symmetrical, in various shapes, e.g. circular, rectangular, hexagonal, etc. Preferably, the microcell reservoirs 16 are rectangular in cross-section. From a plan view, microcell width $w_c$ and the dimension orthogonal to width $w_e$ in the same plane should have a dimensional ratio from 1:1 to 1:5. Subsequent description gives more detailed information on wall 18 fabrication.

FIG. 1B shows microcell reservoirs 16 filled with an electro-optical imaging fluid 20. The imaging optical state of this material is controlled by signals provided at one or more electrodes 22. In one embodiment, a dual set of electrodes 22 can be on the same side of microcell reservoir 16, referred to as an in-plane arrangement, illustrated in FIG. 1B. Alternately, electrodes 22 can be placed at different positions, in other embodiments or variations of display device 10, as is familiar to those skilled in the electro-optical imaging arts. The electrodes 22 can be formed onto support sheet 12 before or after walls 18 are formed, using techniques such as microlithography or other deposition methods. Where necessary, electrodes 22 can be transparent, formed from materials such as ITO (Indium-Tin-Oxide) for example. Optionally, one or more electrodes 22 can be formed on a cover sheet, as described subsequently. There may be more than two electrodes associated with each cell.

The term "display," in the simplest form, is an electro-optical imaging fluid device comprising row and column electrodes in which an electric field causes a material to light shift or modulate. A pixeled display is an array of microcells formed by row and column electrodes with independent control for varying the electrical field intensity for each pixel. Preferably, each microcell in the microcell array is associated with not more than one image pixel. The electro-optical imaging fluid associated with each pixel can then be shifted in response to field changes. A cross-over is two or more electrodes that intersect each other at different height planes. They are usually separated by a dielectric or otherwise insulating material. An electrically conductive material typically is, but is not limited to, a line. A bus bar is a highly conductive electrode that supplies or feeds other electrodes or electrical devices. A gate electrode is an electrode that controls the movement of materials that have an electrical charge. By making the gate electrode the same charge as the particles or droplets contained in the electro-optical imaging fluid, the material will be electrical repelled from the gate, and therefore the gate can prevent the material from moving to proximate areas of the pixel. A collector is an electrode that is used to assemble or otherwise attract and hold materials that have a charge in the electro-optical imaging fluid. The collector electrode attracts the material using an opposite charge to that the material. It usually is a small area outside of the viewing area for the pixel. As used herein the terms "dielectric" and "electrically insulating" mean the same thing. They refer to materials that generally do not substantially conduct electricity.

A helper is an electrode used to assist the movement of materials so as to spread them out in a somewhat uniform manner. Typically the electrical field lines are more intense on the edges and charged particles in the electro-optical imaging fluid will tend to concentrate on the edge closes to the particles. By applying a slightly more intense electrical field on the opposite edge, the material will tend to spread out more uniformly over a larger area.

A flag is an electrode (also called a view electrode) is area in which material is moved for viewing. The area footprint is much larger than the other electrodes. The electro-optical imaging fluid is spread out for easier viewing. By moving material in and out of the flag area, the color of the pixel can be changed.

In one embodiment of an electrophoretic device, imaging fluid 20 comprises charged particles, which particles may be a solid inorganic material, although other materials are possible. The particles are dispersed in a transparent or colored organic dielectric fluid, preferably a long chain hydrocarbon or paraffin compound, which may be halogenated.

As shown in FIG. 1C, display device 10 is formed when a sealing layer 24 is applied onto each filled microcell reservoir 16. Sealing layer 24 is typically a flexible plastic material and is typically conformal with the top surface of electro-optical imaging fluid 20 in each microcell reservoir 16, as described subsequently. Entrapment of air bubbles during the sealing of each microcell reservoir 16 should be avoided, in order to provide a uniform image and to prevent contamination of electro-optical imaging fluid 20.

As can be seen from the preceding description, the simplified sequence of FIGS. 1A, 1B, and 1C is fairly straightforward in concept. However, in practice, there are a number of difficulties that pose significant difficulties and undesirable complications, particularly for the tasks of filling and sealing microcell reservoirs 16. Among problems that must be addressed or resolved are the following:

(i) each microcell reservoir 16 must be filled to the proper depth, with the correct mixture of electro-optical imaging fluid 20;

(ii) in general, electro-optical imaging fluid 20 itself is incompatible with many adhesives, such as those that might otherwise be used to affix the material of sealing layer 24 with the material of walls 18, for example, many types of electrophoretic fluids comprise an oil-based carrier medium that inevitably is deposited on the top surfaces of walls 18 intended for adhesive contact;

(iii) entrapment of air bubbles in each filled microcell reservoir 16 must be avoided; and (iv) sealing layer 24 should be sufficiently flexible, allowing a suitable amount of bending of display device 10 without damage.

As was described earlier in the background section, there have been a number of attempts at addressing filling and sealing problems, but each proposed solution has its drawbacks. One prior-art solution capped each microcell individually, but this approach adds complexity to the fabrication process and can compromise optical density. Another prior-art method involves lamination suitable for electrophoretic imaging materials that are dried. Yet another prior-art method requires a complex solution for encapsulation of adhesive and requires a level of stiffness of compressive surfaces that may not be optimal for other stages of device fabrication.

Figure 2:
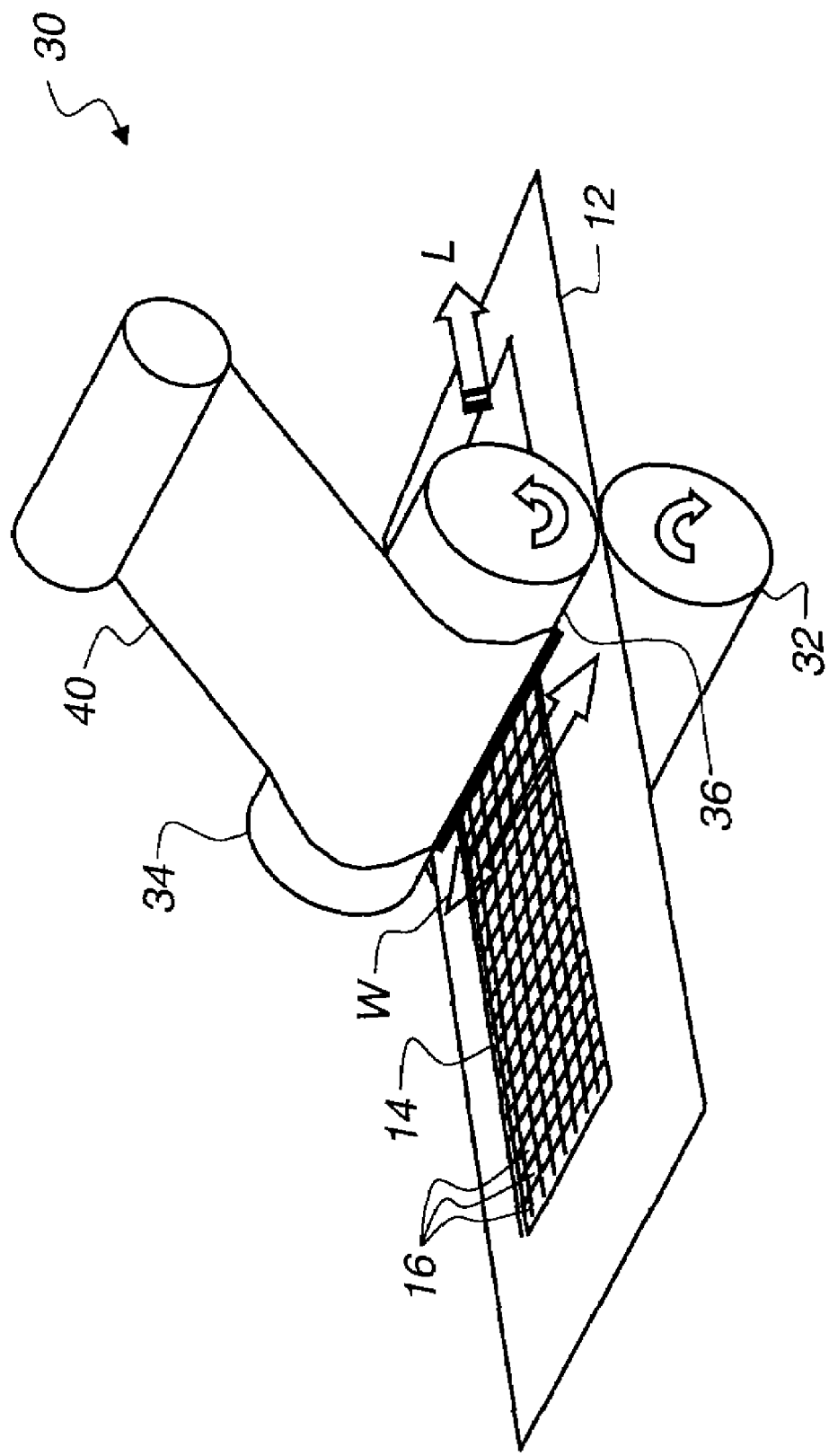
FIG. 2 is a perspective view of a web-based manufacturing process for electrophoretic display device according to the present invention.

Referring to FIG. 2, there is shown, in a perspective view, a filling and sealing apparatus 30 that can be used to carry out the present invention. Support sheet 12 provides a base sheet as was described with reference to FIGS. 1A-1C, with array 14 of microcell reservoirs 16. Rollers 32 and 34, at least one of which is heated, cooperate to form a nip 36. Rotation of rollers 32 and 34 moves support sheet 12 forward into nip 36 and in a lamination direction L, also referred to as the machine direction, perpendicular to a width direction. Support sheet 12 is fed into nip 36 along with an adhesive cover sheet 40. As shown in the cross-section view of FIG. 3, adhesive cover sheet 40 has an adhesive layer 42 applied onto a cover layer 44. Adhesive cover sheet 40 is laminated onto support sheet 12 in order to form protective sealing layer 24 (FIG. 1C). The adhesive layer 42 can be applied to cover sheet 40 at some point prior to nip 36. Optionally, the cover sheet 40 can include a layer of an antistatic material, which can prevent static at the nip during lamination, which otherwised may cause non-homogenous filling of the microcells, particularly as the particles in the fluid are charged and may be effected by locations of static buildup. Antistatic materials and layers thereof that may be employed for this purpose are disclosed, for example, in commonly assigned U.S. Ser. No. 10/953,623, filed Sep. 29, 2004, entitled "Antistatic Layer For Electrically Modulated Display," now U.S. Pat. No. 7,087,351, hereby incorporated by reference.

Figure 4:
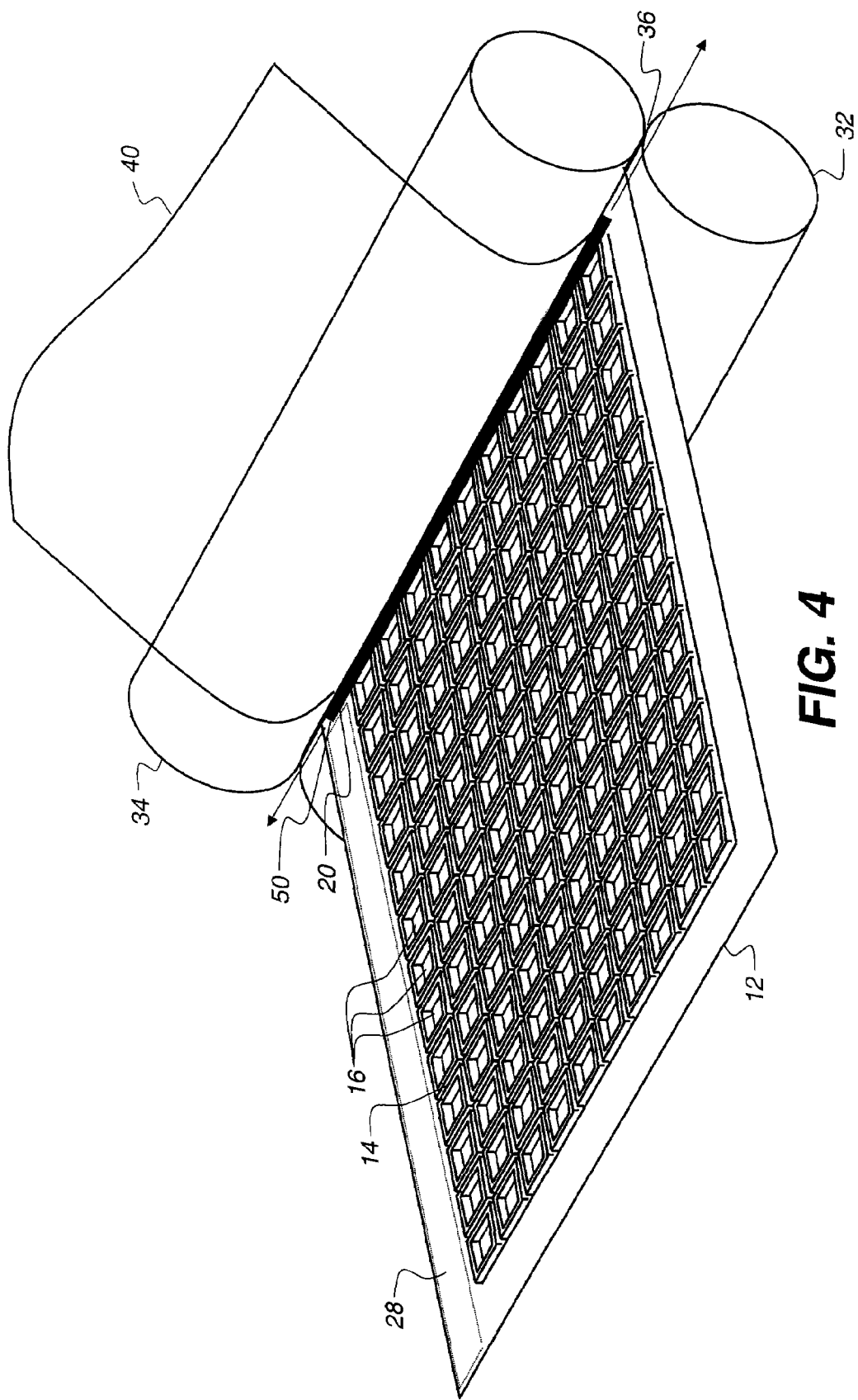
FIG. 4 is a perspective view of electrophoretic device being fabricated in which a rolling bead is formed as the microcells are being sealed.
Figure 12:
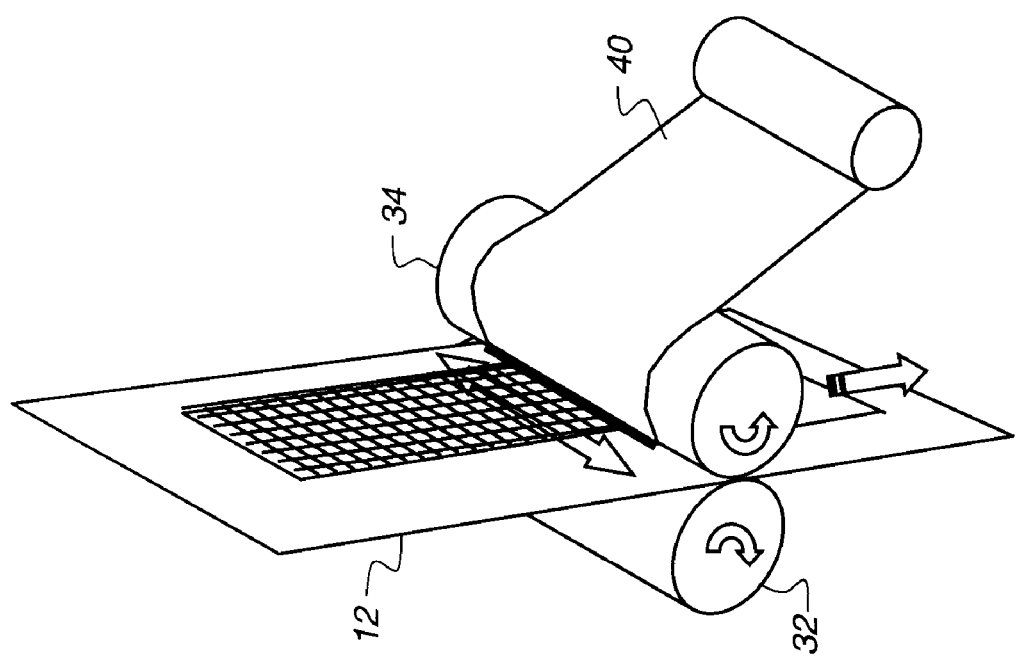
FIG. 12 is a perspective view of an electrophoretic device being fabricated in which lamination travels in a substantially vertical direction.

In one embodiment, upper roller 34 is heated and adhesive cover sheet 40 is pre-wrapped partially around upper roller 34 in order to help warm adhesive cover sheet 40 prior to its entrance into nip 36. In one embodiment, a wrap extending from 30 degrees to nip 36 is used for this pre-heating. Preferably, the range of values for wrap of this sheet is from about 30 to about 200 degrees, with a more preferable wrap obtained in the range of from about 45 to 180 degrees. Lamination between rollers 32 and 34 is carried out at a temperature that is typically between about 90 and 150° C., preferably 100 to 150° C. The pressure applied at nip 36 is suitably in the range of 50 to 200 kiloPascals preferably 100-kiloPascals using a roller having a durometer of 65-70 Shore A. This laminates the cover sheet 40 with support sheet 12. Control of sheet temperatures and tension is necessary to obtain good alignment between sheets 12 and 40. The addition of fiducial marks or other alignment aids may be desirable. Advantageously, either or both support sheet 12 and adhesive cover sheet 40 can be provided in web form, as continuous film sheets. The orientation of support sheet 12 during fabrication must allow microcell reservoirs 16 to be filled and sealed. Horizontal orientation of travel is shown in FIGS. 2 and 4. However, some other suitable travel orientation such as a vertical orientation, as shown in FIG. 12, could be alternately used.

It may be advantageous to control the replenishment rate of the imaging fluid into the rolling bead (prior to the nip) so that it is substantially equal to the filling rate of the microcells as it exits the nip, in order to achieve adequate adhesion of individual cells. Too much replenishment rate will create excessive flow out to the edges and reduce ability to obtain adequate adhesion, and may increase the size of the bead that will adversely affect the heating of the adhesive layer. An insufficient replenishment rate will starve will the bead leading air entrapment.

The perspective view of FIG. 4 provides an enlarged view of what happens at nip 36. Rollers 32 and 34 rotate to apply heat and compression at nip 36, laminating cover sheet 40 over array 14 and other portions of support sheet 12, as described subsequently. Microcell reservoirs 16 are filled with electro-optic imaging fluid 20 as support sheet 12 travels toward nip 36. A fluid supply mechanism (not shown) provides a continuous supply of electro-optic imaging fluid 20 that fills each microcell reservoir 16. In a preferred embodiment, support sheet 12 is filled with dielectric fluid upstream of nip 36 or in a space between the support sheet 12 and cover sheet 40 before nip 36. (As shown in FIG. 4, at least one width-wide row of microcells are filled upstream of the nip, and the bead preferably should cover at least one row of microcells.) Electro-optical imaging fluid 20 can be applied to the first sheet by hopper coating, curtain coating, inkjet, a simple header pipe or line with holes, etc.

In one embodiment, microcell reservoirs 16 are filled and sealed by applying an excessive amount of electro-optic imaging fluid 20 to the microcells in the array 14, then removing the excess fluid 20 via a blade system, thereby leaving fluid 20 in the cells.

As discussed further below, the microcells in the array may be oriented at an angle to the lamination direction, unlike the orientation shown in FIG. 4. An angled orientation may improve the displacement of air and, therefore, be less prone to air entrapment.

During rotation of rollers 32, 34, compression of microcell array 14 against cover sheet 40 within nip 36 helps to minimize or eliminate entrapment of air bubbles within microcell reservoirs 16 and causes a continuous bead 50 of electro-optical imaging fluid 20, from excess fluid forced from microcell reservoirs 16 by the rollers, to be formed in the space just behind nip 36. Referring back to FIG. 2, bead 50 is substantially aligned with the width W of array 14. This allows bead 50 to top off unfilled microcell reservoirs 16 in order to maintain a uniform optical density across the width of array 14.

Figure 5:
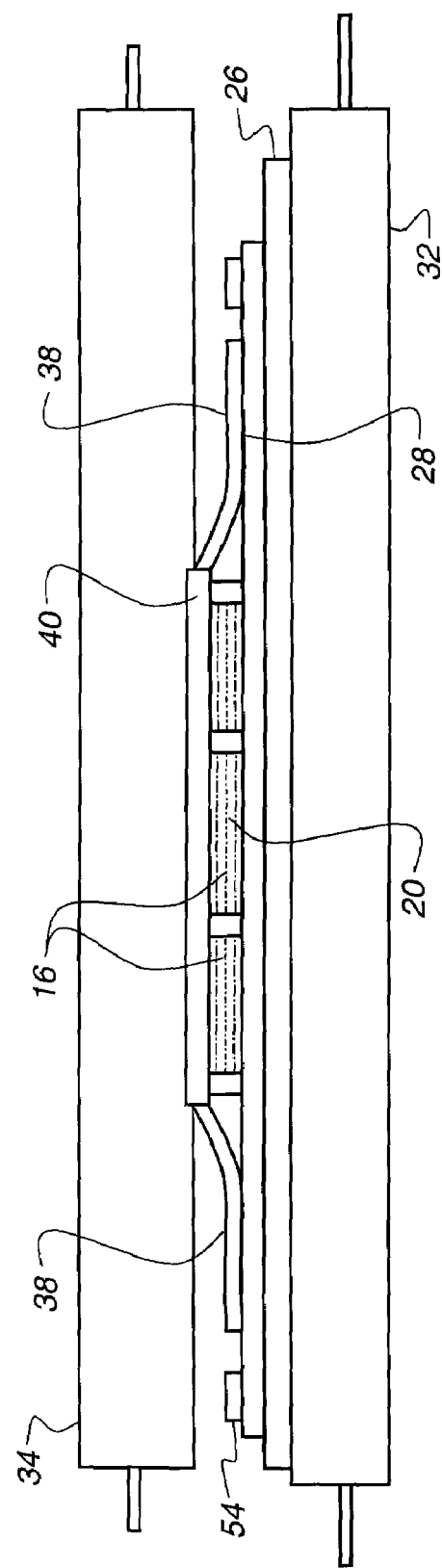
FIG. 5 is a cross-sectional front view of the application of a cover sheet over the microcells according to one embodiment.
Figure 6:
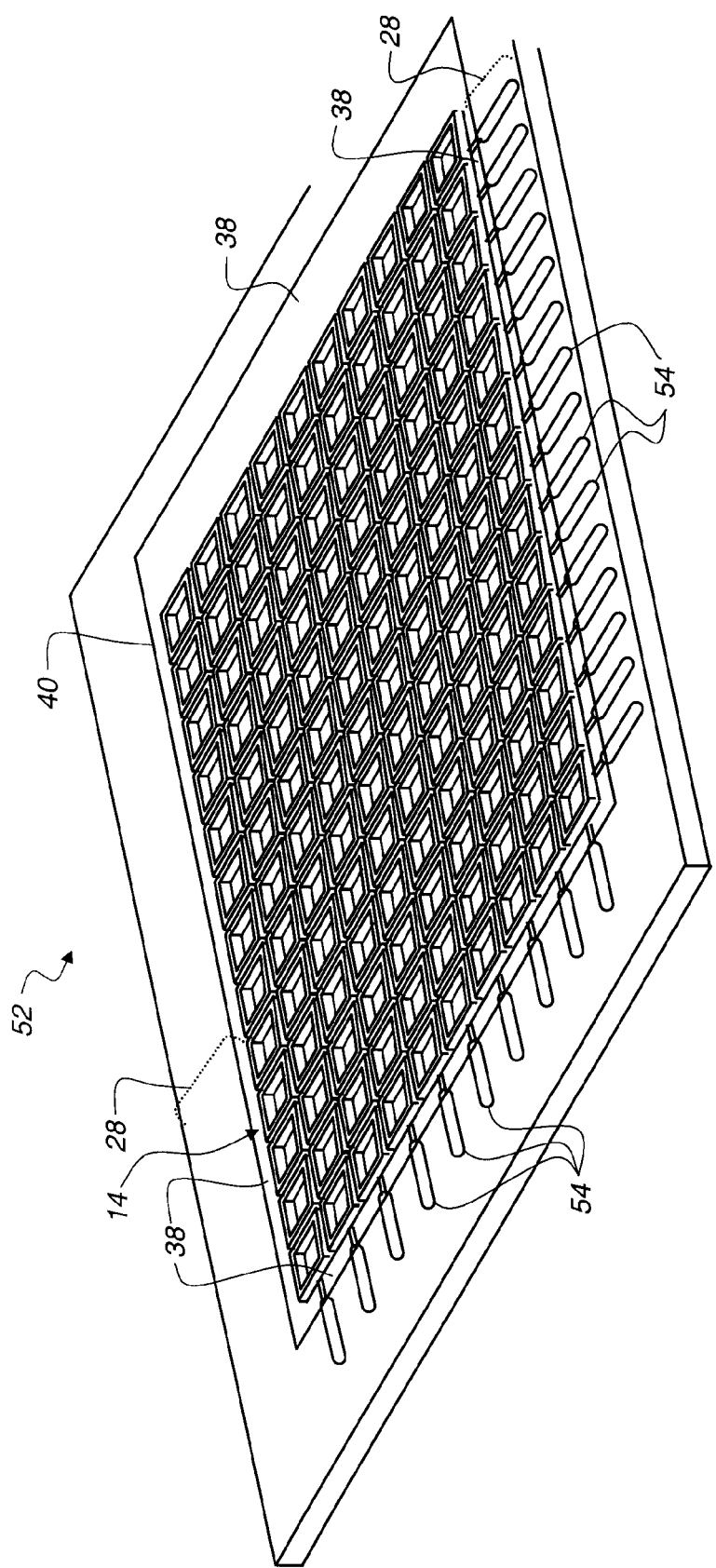
FIG. 6 is a perspective view of a portion of an electrophoretic device comprising a sheet having an arrangement of electrodes and an array of microcell reservoirs.
Figure 7A:
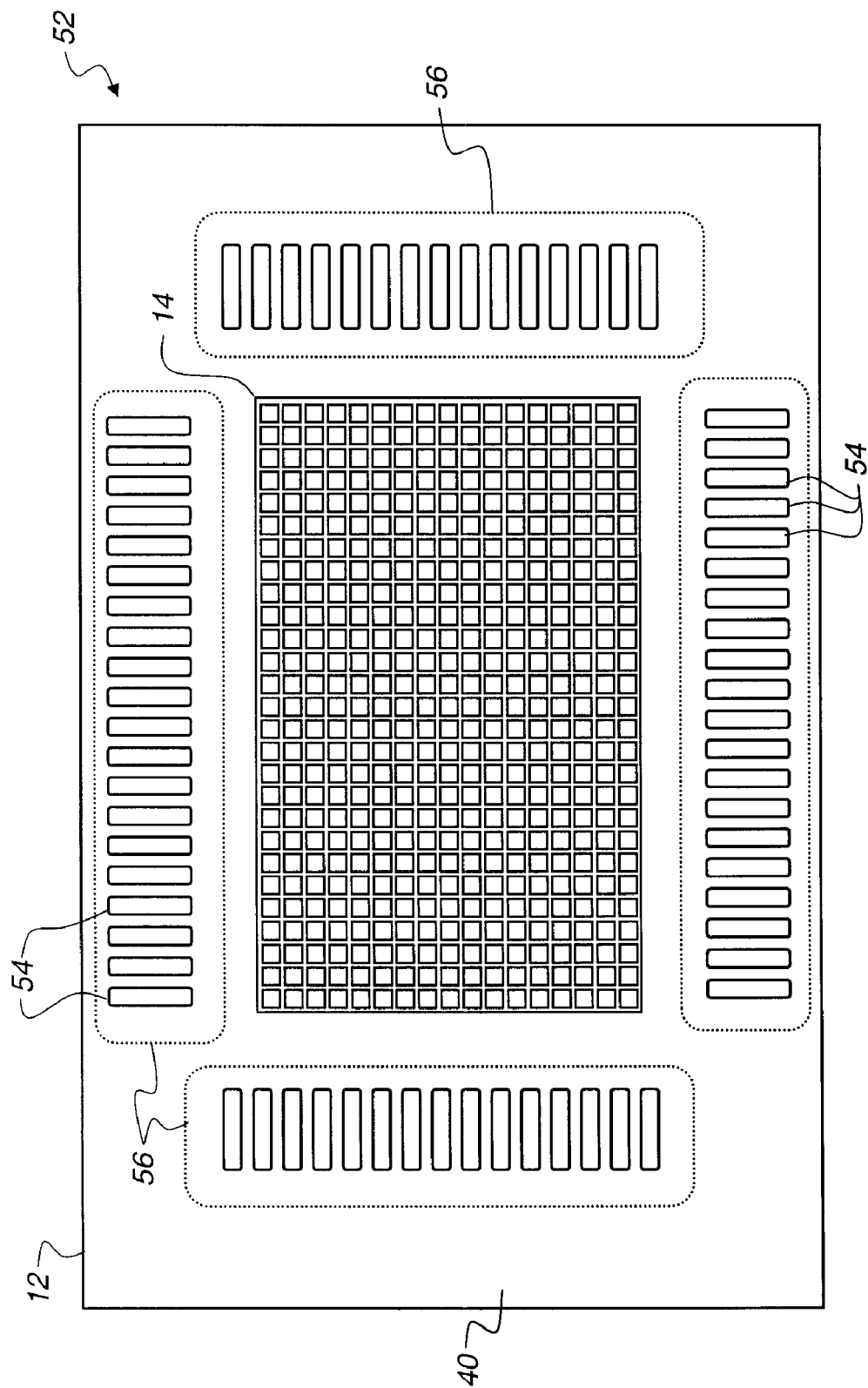
FIG. 7A is a plan view of a portion of an electrophoretic device comprising a sheet having a different arrangement of electrodes.

It may be observed that bead 50 has a tendency to flow outward or sideways, in the width W direction. However, compensating measures can be taken to effectively contain this fluid to within the width of array 14. As shown in FIG. 4, there may be a boundary area 28 along one or more edges of support sheet 12, between the outer edge of support sheet 12 and outer boundary of microcell array 14. In one embodiment, as shown in FIGS. 5, 6, and 7A, boundary area 28 is utilized to provide a perimeter seal 38 out-board of the cell area. The perimeter seal is formed in addition to individual microcell seals. The out-board perimeter seal is formed substantially at the same time as the individual microcell seals. Due to the compliancy of the roller 34 and 32, the cover sheet with the adhesive layer will be compressed against substrate, thereby forming a perimeter seal.

A supplemental absorbent sheet 26 is provided in order to absorb sideways excess electro-optic fluid 20 that may be forced out beyond the edges of support sheet 12, although this may be controlled or minimized by the perimeter seal. Absorbent sheet 26 may be wrapped around one or both of rollers 32, 34 for example.

The perspective view of FIG. 6 shows adhesive cover sheet 40 laminated onto the microcell array to form an electrophoretic display element 52 in one embodiment. Perimeter seal 38 is provided along the side edges of microcell array 14, in boundary area 28, as well as along front and rear edges as the laminate progresses through the nip. Electrodes 54 for electrical contact are disposed along edges of microcell array 14 and are not covered by cover sheet 40 in order to allow appropriate electrical connection. In the embodiments of FIGS. 5 and 6, electrodes 54 extend beyond the edges of cover sheet 40. In the alternate embodiment shown in the plan view of FIG. 7A, windows 56 or some other type of openings, shown in dotted outline, are provided through cover sheet 40 in order to allow access to electrodes 54. Cover sheet 40 extends substantially fully to the edges of underlying support sheet 12. Windows 56 could be provided, for example, by interposing a blocking material that prevents good lamination over contact areas and subsequently cutting the windows into the cover sheet. Alternatively, the cover sheet can be precut with the desired windows.

Figure 7B:
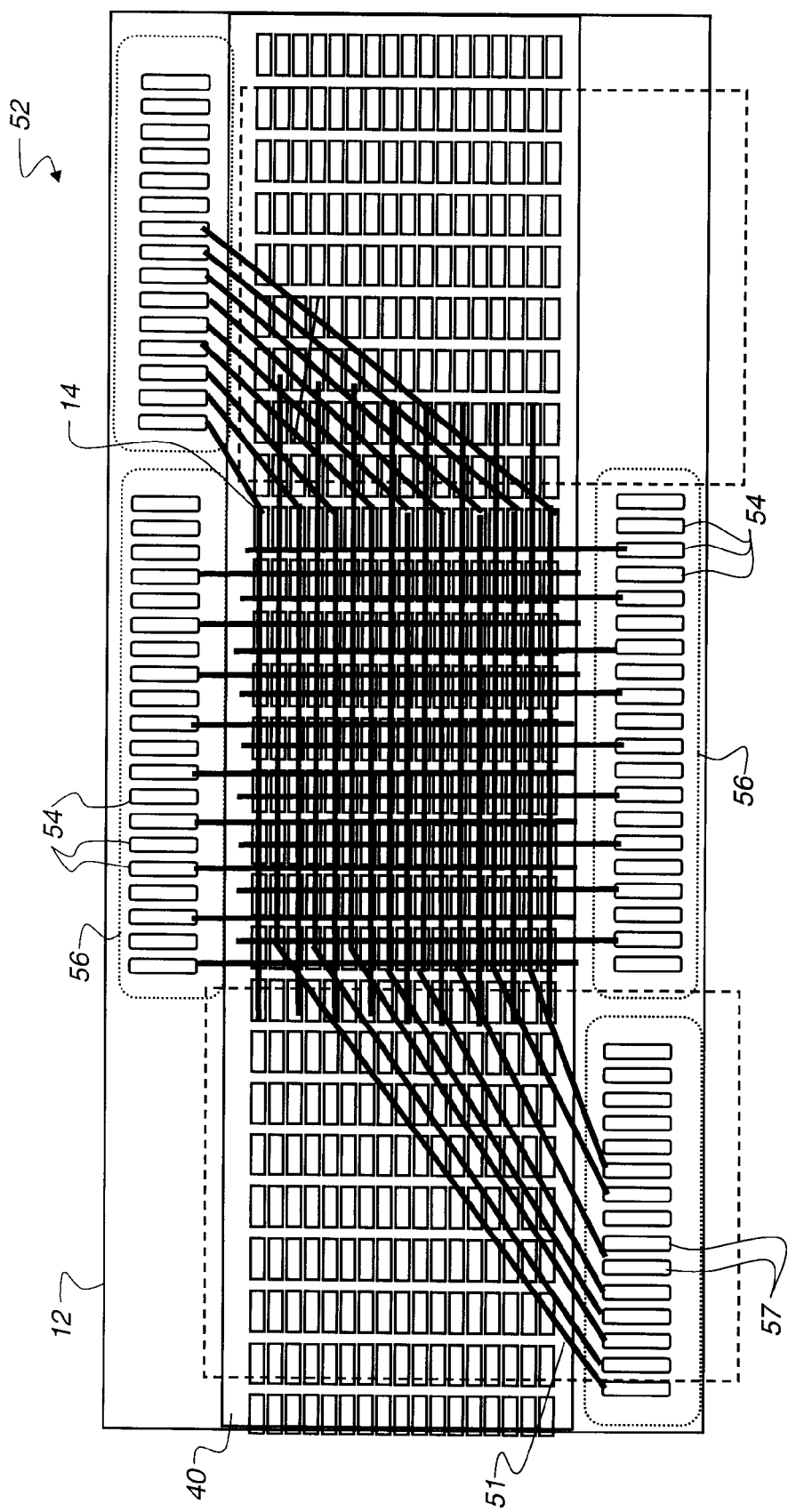
FIG. 7B is a plan view of a portion of an electrophoretic device showing a variation of the embodiment of FIG. 7A in which electrodes are moved out of the path of lamination sealing.

FIG. 7B shows a variation of the embodiment of FIG. 7A in which electrodes are moved out of the path of lamination sealing. This is advantageous, since it avoids the need for a window in the cover sheet. In FIG. 7B, the machine direction displaced electrodes 57 of FIG. 7A are relocated on the sides of the first sheet in addition to the electrodes 54. The electrodes 57 are connected by the use of vias 51, for example electrical lines, wires, or traces, which are advantageously protected by the cover sheet. Preferably, as shown in FIG. 7B, the first sheet provides a continuous microcell pattern that can be filled and sealed, in order to eliminate the need for lengthwise patterning of cells and/or patterning of the adhesive. However, this results in alternate regions of the continuous microcell pattern (outlined by the dotted rectangles in FIG. 7B) that, in a display, are not actively driven and, hence, are in the frame area of the display outside the imaging area. It is understood that the embodiment of FIG. 7B may result, during a roll-to-roll manufacture, in alternate areas of drivable microcells and non-drivable microcells along a continuous web of microcells.

Figure 8:
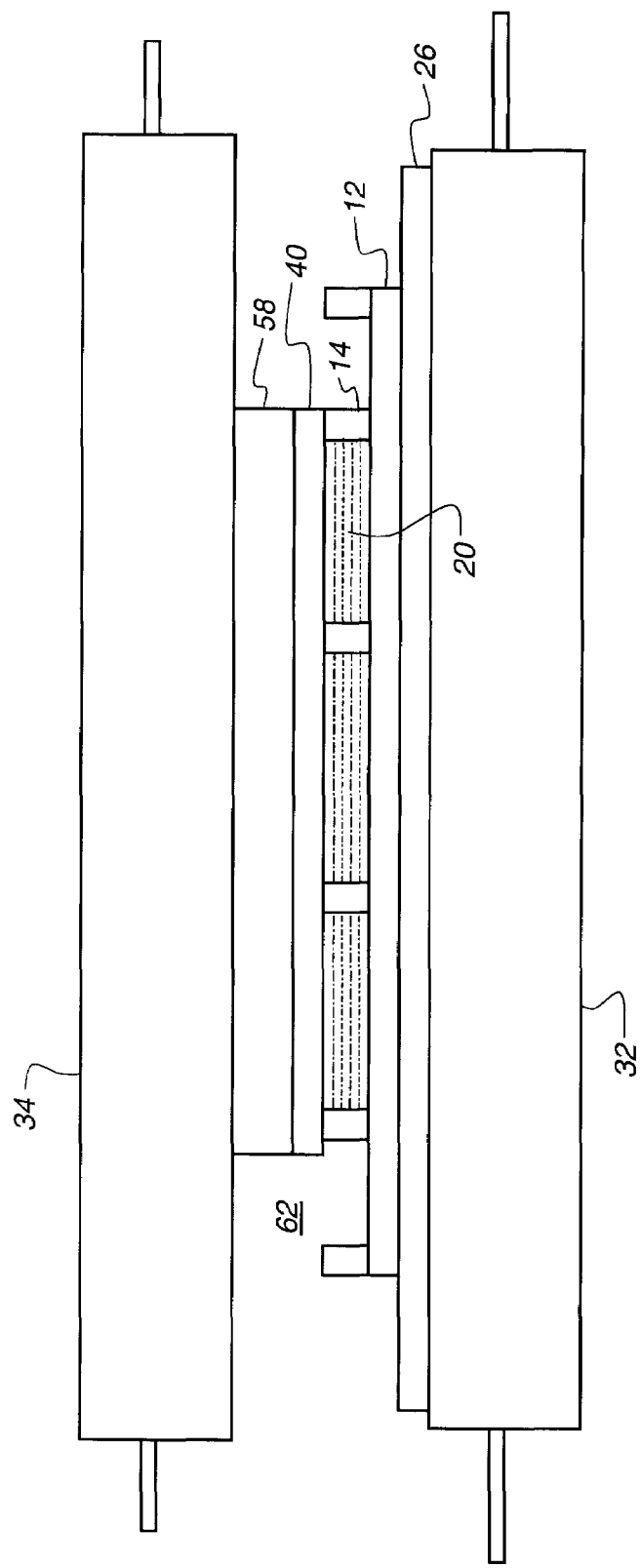
FIG. 8 is a front view of an electrophoretic device being fabricated using a cover plate for a roller used in the fabrication.
Figure 9:
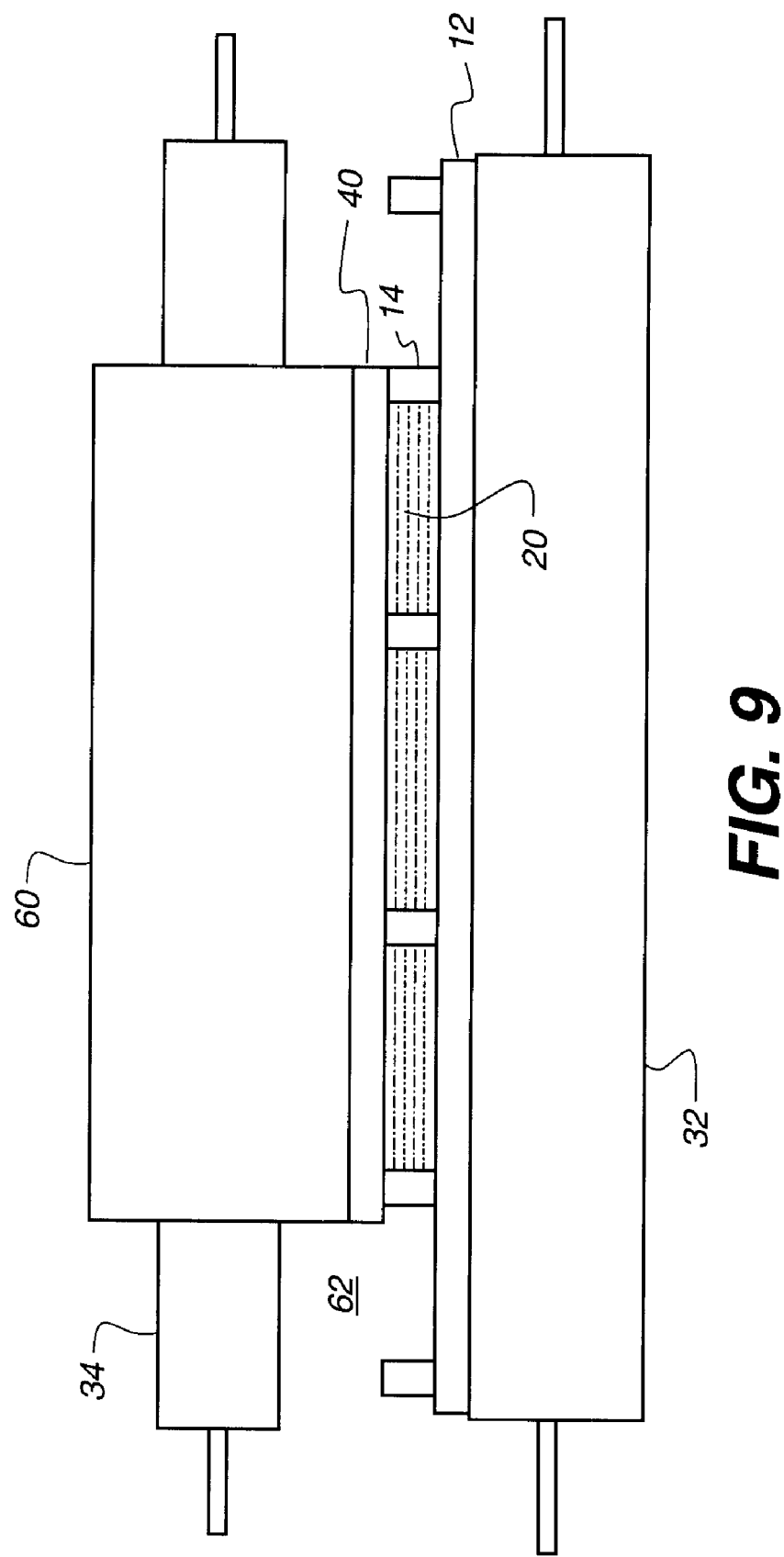
FIG. 9 is a cross-sectional side view of cover sheet being applied over filled microcells according to an alternate embodiment.

An alternative to using perimeter seal 38 is to provide some other mechanism for managing imaging fluid 20 that may be forced from microcell reservoirs 16. In one embodiment, as shown in the front view of FIG. 8, one or more of the outermost rows (in machine direction) of microcell array 14 may be used as a gutter for excess imaging fluid 20. A shim 58, made from a metal or other suitable material, is interposed between roller 34 and adhesive cover sheet 40 over the top surface of a central portion of array 14, leaving an unused side portion 62 along the width of the array. Shim 58 defines the area over which pressure is applied and leaves unused portions 62 where rollers 32 and 34 do not make contact. With this arrangement, excess electro-optical imaging fluid 20 can be controllably channeled away from bead 50 behind nip 36. As shown in FIG. 9, an alternative to shim 58 is sleeve 60, such as a metal sleeve that is suitably dimensioned to the proper width for lamination of cover sheet 40 against support sheet 12, with sleeve 60 wrapped about or extended radially from roller 34.

Figure 10:
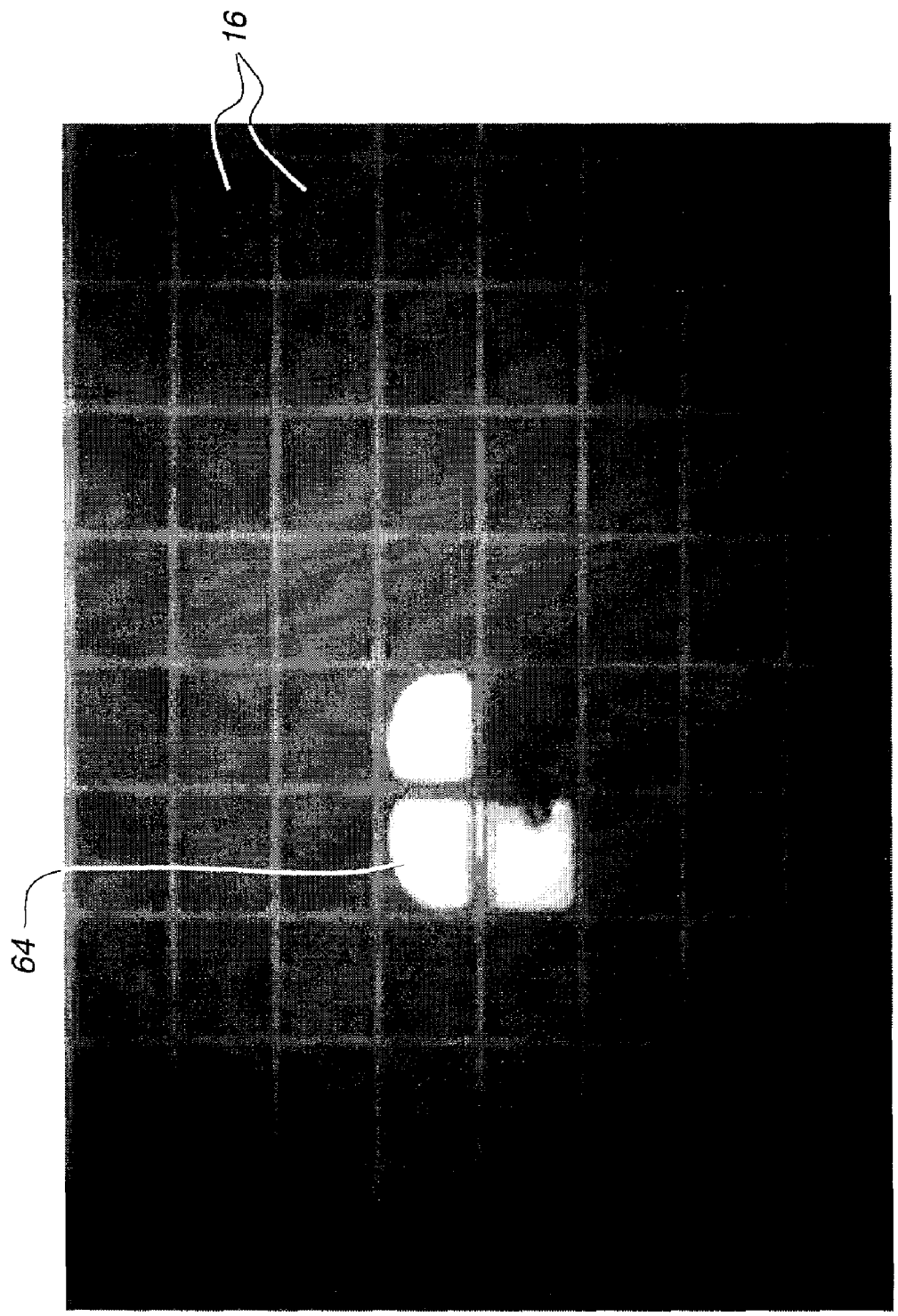
FIG. 10 is a plan view of an electrophoretic device comprising a sealed array of filled microcells exhibiting a seal defect in some of the cells.

As stated earlier, one objective of filling and sealing apparatus 30 is to prevent entrapment or residual air bubbles from individual microcell reservoirs 16. The plan view of FIG. 10 shows a portion of an array of microcell reservoirs 16 with a defective cell 64 such as might result from a residual air bubble.

Figure 11:
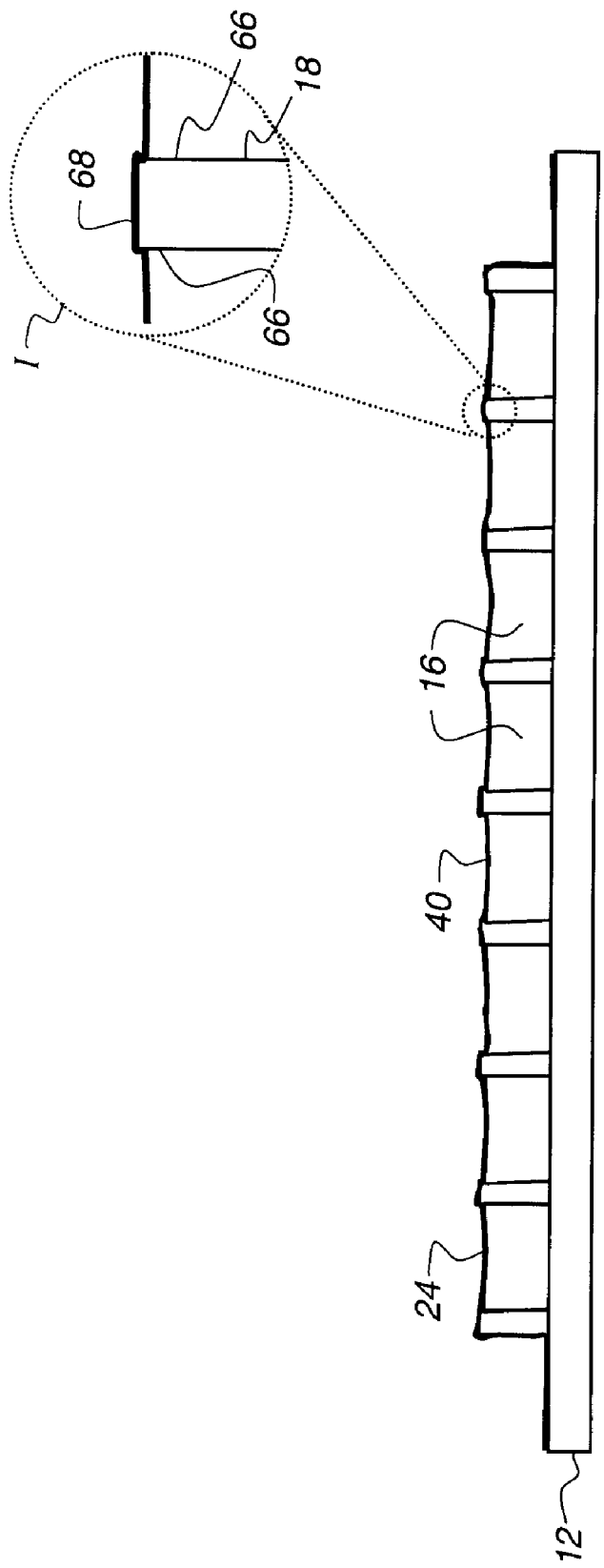
FIG. 11 is a cross-sectional view of an electrophoretic device with a flexible cover layer according to one embodiment of the present invention.

In order to provide a flexible display device, some conformability of cover sheet 40 with the surface of electro-optical imaging fluid 20 is generally preferred when cover sheet 40 is used as sealing layer 24, as shown in FIG. 11. If cover sheet 40 is too stiff or too thick, problems with adhesion and flexibility are more likely. As is shown in an enlarged inset "I" in FIG. 11, cover sheet 40 preferably has at least some adhesion to side surfaces 66 as well as to a top surface 68 of cell wall 18. Preferably, a sufficiently flexible material is used for cover sheet 40, for example a material, such as polyethylene terephthalate, having a thickness less than 75 micrometers, preferably 5 to 30 micrometers, thereby allowing excess dielectric fluid in microcell reservoirs 16 to be displaced from the microcells by the concave deformation of cover sheet 40 into the tops of the microcell reservoirs 16. Usually, the thinner and more flexible the cover sheet, the thinner the adhesive layer that may be necessary to achieve adequate bond strength. Reduced adhesive thickness is desirable for improved optical performance and economic considerations. For example, a 12 micrometers PET (polyethylene terephthalate) cover sheet was found to require $0.9 \ 10^{-6} \times$N-m force to bend the sheet; a 35 micrometers PET (polyethylene terephthalate) cover sheet was found to require $2.2 \ 10^{-4} \times$N-m force to bend the sheet; a 75 micrometers PET (polyethylene terephthalate) cover sheet was found to require $2.1 \ 10^{-3} \times$N-m force to bend the sheet; and a 100 micrometers PET (polyethylene terephthalate) cover sheet was found to require $5.1 \times 10^{-3}$ N-m force to bend the sheet.

A number of different electrode arrangements are available for providing control signals to each microcell reservoir 16. Electrodes may be formed onto support sheet 12 prior to or during fabrication of walls 18. Electrodes may also be formed onto cover sheet 40 to provide one or more electrical connections to each microcell reservoir 16.

Another aspect of the present invention relates to an electro-optical display comprising an array of microcells sealingly filled with an electro-optical imaging fluid, in which an integral second sheet is laminated to a first sheet, which integral second sheet comprises an adhesive layer over a support, the integral second sheet simultaneously (a) forming a seal over each of the microcell reservoirs in the array, thereby forming the sealingly filled microcells, and (b) sealingly bonding an outer perimeter area of the second sheet to the first sheet within the flat boundary area of the first sheet. The electro-optical display further comprises an electrical driver for providing control of electrical switching of the optical state of the electro-optical fluid in each microcell in the array. The first sheet comprises a patterned element having optical or electrical functionality associated with individual microcells of the array, which patterned element can comprise a mask, to hide charged particles in the electro-optical fluid, thereby enhancing contrast. The patterned element can also comprise bus bars, collector electrodes, gate electrodes, flag electrodes, and/or electrode pad areas. Suitably the patterned element is positioned in regions all or partially under the array of microcell reservoirs of the first sheet. The second sheet can optionally have windows as described above. Preferably the array of microcells is rectangular in shape and the flat boundary area in the first sheet forms a rectangular frame around the array.

Yet another aspect of the present invention relates to an electro-optical display comprising an array of microcells sealingly filled with an electro-optical imaging fluid that comprises charged particles dispersed in a carrier fluid that is a transparent or colored organic dielectric fluid comprising a long chain hydrocarbon or paraffin, preferably 8 to 15 carbon atoms, optionally halogenated, in which an integral second sheet is laminated to a first sheet, which integral second sheet comprises an adhesive layer over a support. The integral second sheet seals each of the filled microcell reservoirs in the array, the adhesive layer adhesively bonding to the tops of the side walls of each microcell reservoir in the array. The adhesive layer must be capable of bonding the integral second sheet to the top of the side walls of the microcell reservoirs even when covered or wetted with an oily material, namely the carrier fluid. This is particularly advantageous when the microcells being sealed contain a slight excess of carrier fluid to prevent bubble entrapment during sealing, leading to bead formation and lateral migration of the excess carrier towards the sides of the first sheet, thereby wetting the tops of the side walls with the dielectric fluid. Of a wide variety of adhesive materials tested, only certain copolyester resins and thermoplastic polyurethanes exhibit this level of adhesion. Superior adhesive materials for achieving this purpose include polyester-type thermoplastic polyurethanes (TPU) such as those under the trade name ESTANE, manufactured by Noveon, Inc. (Cleveland, Ohio), and amorphous or semi-crystalline copolyester resins such as those under the trade name VITEL, manufactured by Bostik, Inc. (Middleton, Mass.). Particularly preferred are VITEL 3501. Preferably, the dry bond strength should be greater than 18 N/100 mm. Preferably, the wet bond strength (with dodecane) should be greater than 12-18 N/100 mm.

With respect to adhesives that are copolyester resins, adhesives having a low glass transition temperature ($T_g$) and/or low tensile strength coupled with a high elongation provide an acceptable level of adhesion. In particular, it is preferred, especially with respect to VITEL adhesives, that the adhesive have a Tg less than 0° C., preferably less than 10 C, a tensile strength less than 20 mPa, more preferably less than 5 mPa, and a percent elongation greater than 1000.

The suitability of the adhesive layer is also dependant upon the adhesive thickness and the temperature of the laminating roll 32 and/or 34. A minimum adhesive thickness of 5-8 micrometers may be required to provide the desired level of adhesion when bonded at a roll temperature of 138° C. Preferably, bonding temperatures are above 110° C., more preferably above 125° C. Lower bonding temperatures tended to produce weaker bonds.

The support sheet 12 with array 14 can be made in a variety of ways. One embodiment employs a pre-patterned temperature controlled roller, the cylindrical surface of which has been patterned with a continuous array of microcells that contain both male and female features. The pattern on the temperature-controlled roller is formed in a seamless manner. A molten polymer such as polyolefin, PMMA, polycarbonate, or TAC is extrusion cast onto the temperature controlled roller from a melt extruder. The molten polymer may be cast first onto the patterned temperature controlled roller and then brought into a nip formed with a pressure roller or the molten polymer may simultaneously contact both rollers. Molten polymer may be extruded directly into the nip formed by the patterned roller and the pressure roller or the melt stream may be offset slightly to contact the pressure roller first. The nip pressure aids in forcing the molten polymer to conform to the features on the pattern temperature controlled roller surface. The mass of the polymer is such that there is an excess amount that forms an integral stiffening member to the pattern feature, therefore eliminating the need for a transfer sheet.

The molten polymer may further comprise melt additives to provide melt stability, release agents to aid in the removal of the sheet from the temperature controlled roller surface, or UV absorber to help protect the electro-optic materials that are used to form colors in some types of display.

A support sheet formed from an extrusion roll molding (ERM) process has significant advantages over UV cured sheets. The ERM sheet has improved clarity, improved stiffness and does not have to undergo a slow radiation-curing step. A wide variety of extrusion grade polymers may be used. The ERM process typically is much faster than a UV curing process and, therefore, is more economical.

The ERM process differs from hot stamping or embossing in a number of important aspects. Hot stamping and embossing apply heat and or pressure to a preformed sheet or substrate. The heat and pressure is used to allow the preformed sheet to taken on the form of the desired pattern formed into the surface. The preformed sheet undergoes a cold flow process that freezes stresses and strains into the sheet. Typically such sheets have poor lay-flat properties and appear to be wavy and have curl. In contrast, surface patterns that have been formed by hot stamping or embossing are very difficult to fill and seal for use in electro-optic displays.

In the ERM process, the base polymer is melted and the viscosity of the resulting molten polymer is able to replicate the pattern of complex surfaces such as associated with an array of microcells. The heated polymer is then quenched to freeze the polymer into the desired pattern. Sheets formed by ERM are less prone to waviness and curl and therefore are easier to handle during filling and sealing.

In another aspect of this invention additional integral layers may be coextruded simultaneously or extruded in two or more sequential extrusion processes within the same or different manufacturing line. In an ERM process using two or more layers, the layer in direct contact with the temperature controlled roller may have properties that improve replication of the desired pattern, improve chemical resistance to the electro-optic materials that will be used to fill the micro-cell pattern, or provide improved sealing to a secondary sealing sheet. The other layer(s) may use the same or different polymers than the layer that contacts the temperature controlled rollers. If a different polymer is used it may be advantageous to use a material that can provide improved stiffness that helps to support the display cells or has improved flexural resistance for bending or conformance. It may be advantageous to use a polymer that has improved durability, scratch resistance, or toughness for an external surface. Polymer selection may also consider factors for improved light transmission. This may include, but is not limited to, optical clarity, refractive index matching or step gradings to minimize optical losses at the interfaces between layers, air or electro-optic materials. The polymer layer may further contain polymers or materials to enhance water vapor barrier properties as well as gas barriers such as oxygen and ozone that may affect colorants in the display. Multi-layer improvements may be extremely difficult when using a UV cast/curing process.

In another embodiment, additional layers may be applied to either one or both sides of the ERM formed sheet. These layers may include but are not limited to anti-reflection layers, anti-smudge or fingerprint layers, hardcoats, anti-static layers, adhesion promoting layers or patterns, UV absorber layers, layers containing indicia such as logos, trademarks, or security protection, and/or gas barrier layers for contaminants such as water, oxygen and others.

In a further extension of multi-layer extrusion roll molding, two layers may have different thicknesses and or may have the ability to be detached or separated from each other. In this manner, an integral carrier layer can be formed simultaneously with microcell array 14 as opposed to applying it after microcell reservoirs 16 have been formed. With such an arrangement, the bottom supporting layer may then be removed to from a very thin micro-cell array. Control of the thickness of the micro-cell array may be important when a conductive layer or pattern is attached directly below the cell. Being able to provide a very thin polymer layer between the conductive layer and the electro-optic fluid in the microcell tends to provide improve control of the fluid.

Once the microcell pattern is cast and formed into a solid sheet, the cells can be filled with electro-optic imaging fluid that responds to an electrical stimulus, and then can be sealed using a cover sheet. Electrodes may be further coated using a dielectric material.

The choice of polymer to be used in the ERM process has many considerations. This may include but is not limited to the polymer's chemical makeup such as its molecular weight distribution, its relative amount of crystalline and amorphous regions prior to melting as well as the final properties desired to provide good replications, adequate dimensional stability, chemical resistance to the electro-optic materials, electrical charge retention, and management on the polymer surface and within its bulk, and overall stiffness to minimize warpage under varying environmental conditions. Some difficulties may occur in providing the optimal level for all these parameters from a single material. It may be advantageous to provide additional surface treatments by coating or applying other materials to all or part of the surfaces of the replicated micro-cell array. This may include thin dielectric materials to minimize charge injection or sticking of particles on the cell wall surface. Other possible modifications may include the use of one polymer to form the micro-cell and another polymer or blend of polymers to form the non-microcell side of the cast sheet. This is useful in providing a material that is thicker, provides additional stiffness, toughness and or dimensional stability. Anti-reflection layer, hardcoats, or static control layers may be applied by coating or laminating to the desired side of the array sheet. A two-layer structure of this nature may be provided by coextruding two layer of molten polymer simultaneously using two separate extruders and joining the two polymer flows in a feed block of multi-cavity die. The thickness of the two melt streams can be varied and, therefore, when one of the two polymers touches the moving mold with male and female features only that polymer forms the feature and the other side may touch a smooth mold feature so as to replicate a smooth surface on that side. In such a means of making a micro-cell array, different physical and or optical properties can be made within the array sheet. A different embodiment of forming an array sheet with different properties on each side would be to form the array in a one polymer and melt casting and adhering it on a pre-formed polymer sheet. In this manner the polymer sheet becomes a part of the cell array structure. If the relative bond level between the pre-formed polymer sheet and the melt cast polymer features is controlled, it is possible to make very thin micro-cell arrays that can be removed from the pre-formed polymer sheet and attached to a different material. An additional embodiment would be to melt cast the array as a thin sheet and then adhesively adhere a second sheet to it by applying and adhesive and laminating the array and sheet together in a pressure nip or by melt casting a second polymer layer to the smooth side of the array sheet.

Extrusion roll molded micro-cell arrays can be formed in a continuous roll process. For example, in one embodiment, polycarbonate, PMMA, which can be purchased in pellet form and is dried to remove any surface moisture that may have absorbed or condensed onto the surface, is conveyed into a hopper that is used to feed a melt extruder. A feed screw rotates inside a barrel and external heat is applied to help melt the resin. This process forms a viscous fluid melt of the polymer. The resin is conveyed through the screw and barrel and may enter different sections to assure full melting and temperature uniformity of the melt. The molten polymer may then be filtered to removed any unwanted materials or gel-like slugs. The molten resin is then pumped into a die cavity that enables the melt stream to be distributed across the width of a support sheet. As the melted polymer exits the die, it drops either onto a temperature controlled roller surface with the desired pattern and then into a nip or directly into a nip formed by the temperature controlled roller and another roller. The viscosity of the molten resin as well as pressure in the nip are adjusted to assure good replication of the desired pattern as well as the formation of integral thickness to the cast sheet that adds strength and stiffness that allows the sheet to be conveyed, coated, laminated or wound in roll form. This avoids the need to provide a separate plastic substrate or transfer sheet that is need for certain UV or epoxy cast micro-cells displays.

Useful polymers are typically those that have a relatively high molecular weight and can withstand melt temperature in excessive of several hundred degrees. Typical polymers may include extrusion coatable grades or blends of polycarbonate, polymethylmethacrylate, polyethylene terephthalate, polyethylene naphthate, polyolefin, cyclic olefins, cellulose acetate, ethylene vinyl acetate, polyimides and copolymer derivatives thereof.

While the ERM process described above can be used to provide molded structures useful in this invention, photoresist materials (UV monomers or epoxies) can also be used to provide an alternate means of forming a microcells without the need to provide an expensive mold. In such a process, a radiation sensitive material such as SU-8, a photosensitive epoxy material manufactured by MicroChem Corp. (Newton, Mass.). may be coated onto a web and provided with a soft bake to remove some of the solvents present in this material. The photosensitive material is then exposed to the desired radiation source (UV in this case) using a mask to prevent exposure and subsequent crosslinking in areas where there is no wall. The exposed material is then baked in a dryer and a development/wash step is performed to remove the residual unexposed material thus forming an array of microcells. This method eliminates the need for a mold and the photosensitive material may be coated onto a web with a pre-pattern of electrodes. This is an additive-type step that eliminates the need for critical alignment when the electrodes need to be position within each cell. Furthermore, this process allows the walls to be built onto most any substrate. For instance, if the display (either during manufacturing or in final use) is expected to be exposed to an environment in which the temperature and or humidity is severely cycled, it may be desirable to coat the photoresist material onto an oriented and or heat-set and or heat-relaxed web that has improved dimensional and thermal properties. This provides a more robust display and will help to minimize seal failures. It provides an opportunity to treat or prime the web prior to coating to enhance the adhesion between the web and the photosensitive material. Methods may include, but are not limited to, chemical primers such as polyethyleneimine, various latexes such as acrylic, acryl ate, and copolymers derivates thereof. Web treatment may include, but is not limited to, corona discharge, atmospheric modified corona, as well as vacuum plasma treatments.

A multi-colored electro-optical modulating display, if desired, can be prepared by filling and sealing one microcell array with one electro-optic fluid color, and repeating this process using a second and third colored electro-optic fluid. In one embodiment, a multi-colored display is formed by stacking two or more filled and sealed sheets to one another so that display devices are deployed in a vertical stack. Such a display can have improved color saturation and may be able to replicate more colors. Proper alignment is advisable to assure that the viewing region in each cell array is aligned with the others.

In a preferred embodiment, the electro-optical imaging fluid used in the array of microcell reservoirs can be bistable, so that it forms an image when addressed with an electric field and then retains its image after the electric field is removed. Particularly suitable electro-optical imaging fluids that exhibit "bistability" include many types of electrochemical materials, electrophoretic fluid materials, fluids containing GYRICON particles, electrochromic fluids, magnetic materials, or chiral nematic liquid crystals.

The electrically modulated fluid material may also be a printable ink having an arrangement of particles or microscopic containers or microcapsules. Each constituent microcapsule can itself contain an electrophoretic composition of a fluid, such as a dielectric or emulsion fluid, and a suspension of colored or charged particles or colloidal material. The diameter of such constituent microcapsules typically used for this purpose generally ranges from about 30 to about 300 microns. According to one practice, the charged particles in such constituent microcapsules visually contrast with the surrounding dielectric fluid. According to another example, the electrically modulated material may include rotatable balls that can rotate to expose a different colored surface area, and that can migrate between a forward viewing position and/or a rear non-viewing position. One example of this type of imaging mechanism is the GYRICON technology that had been developed at one time by Xerox Corporation, Stamford, Conn. In the GYRICON device, a material was comprised of twisting rotating elements contained in liquid filled spherical cavities and embedded in an elastomer medium. The rotating elements were made to exhibit changes in optical properties by the imposition of an external electric field. Upon application of an electric field of a given polarity, one segment of a rotating element would rotate toward an observer of the display. Application of an electric field of opposite polarity would cause each element to rotate and expose a different segment to the observer. The bistable GYRICON display would maintain a given configuration until an electric field was actively applied to the display assembly. GYRICON particles typically have a diameter of about 100 microns. GYRICON materials are disclosed in U.S. Pat. Nos. 6,147,791; 4,126,854; and 6,055,091, the contents of which are herein incorporated by reference.

According to one practice, the microcell reservoirs of a display device may be filled with electrically charged white particles in a black or colored dye. Examples of electrically modulated materials and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference.

The electrically modulated electro-optical imaging fluid may also include material disclosed in U.S. Pat. No. 6,025,896, the contents of which are incorporated herein by reference. This material comprises charged particles in a liquid dispersion medium encapsulated in a large number of microcapsules. The charged particles can have different types of color and charge polarity. For example, white positively charged particles can be employed along with black negatively charged particles. The described microcapsules are disposed between a pair of electrodes, such that a desired image is formed and displayed by varying the dispersion state of the charged particles. The dispersion state of the charged particles can be modulated using a variably controlled electric field applied to the electrically modulated material. According to a preferred embodiment, the particle diameters of the microcapsules are between about 5 microns and about 200 microns, and the particle diameters of the charged particles are between about one-thousandth and one-fifth the sizes of the particle diameters of the microcapsules. The microcells switch rapidly between two optically distinct, stable states simply by alternating the sign of an applied electric field.

Those skilled in the art will recognize that a variety of light-modulating electro-optical imaging materials are available and may be used in the present invention. The light-modulating material employed in connection with the present invention, is preferably bistable, not requiring power to maintain display of indicia, at least for a suitable period of time. Such devices, since they do not require a continuous driving circuit to maintain an image, exhibit significantly reduced power consumption due to their non-volatile "memory" characteristic.

A light-modulating electro-optical imaging fluid may be formulated to have a single color, such as black, white, or clear. The particulate components may be fluorescent, iridescent, bioluminescent, incandescent, or may include a wavelength specific radiation absorbing or emitting material for visible, ultraviolet, infrared light. There may be multiple layers of light-modulating material. Different layers or regions of the electrically modulated material may have different properties or colors. Moreover, the characteristics of the various layers may be different from each other. For example, one layer can be used to view or display information in the visible light range, while a second layer responds to or emits ultraviolet light.

Particles may be suspended in any of a group of dielectric solvents exhibiting desirable density halogenated or unhalogenated hydrocarbons and their derivatives.

Figure 3:
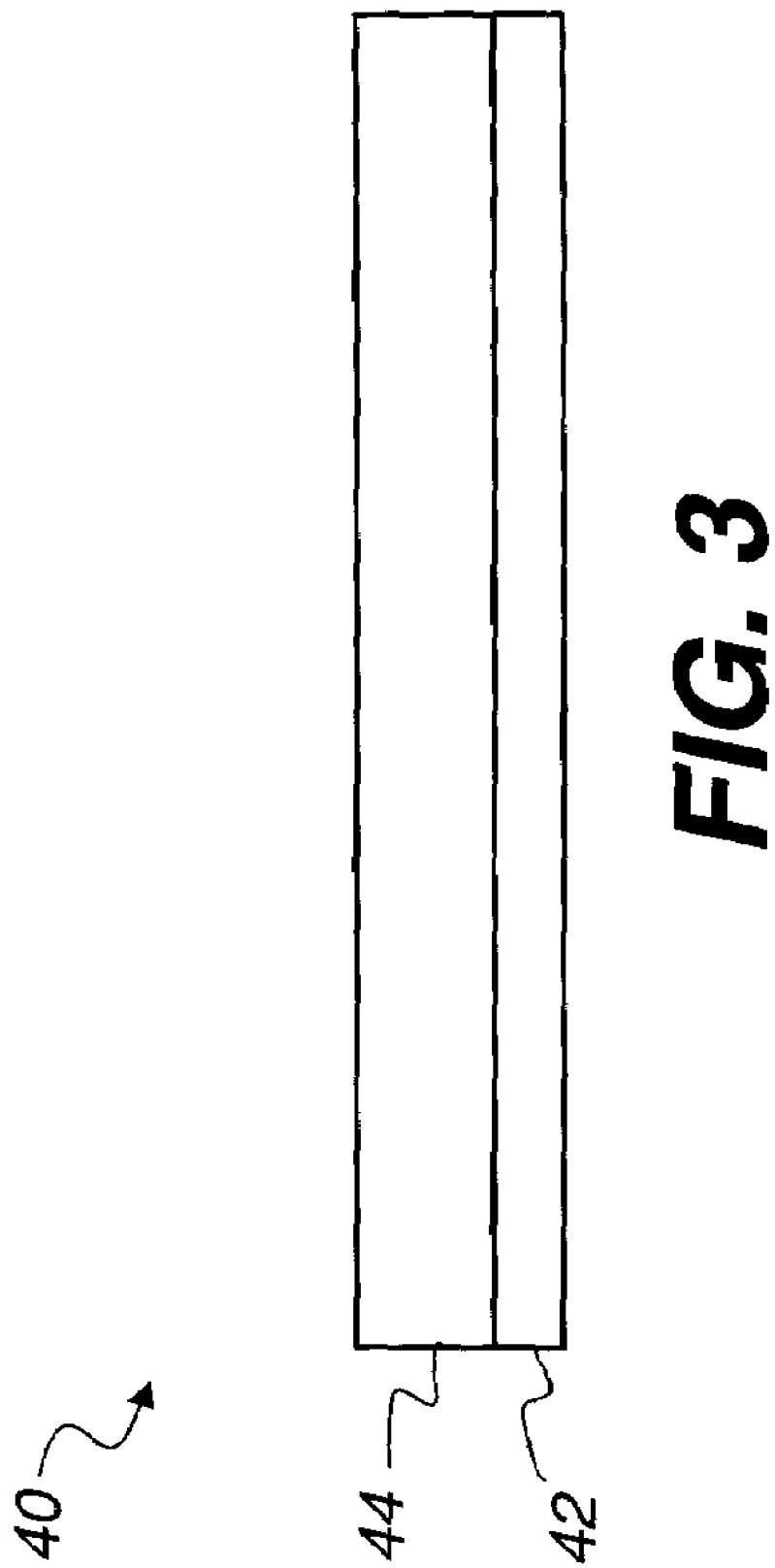
FIG. 3 is a side view showing the structure of an adhesive cover sheet in one embodiment.

A number of possible adhesives can be used as adhesive layer 42 (FIG. 3). In one embodiment, a polyester-type thermoplastic polyurethane (TPU) is used. Other potential candidates for the adhesive layer include amorphous or semi-crystalline copolyester resins, ethylene vinyl acetate (EVA) or styrene acrylonitrile (SAN) copolymers, or polychloroprene or chlorosulfonated polyethylene. These adhesive materials are typically applied from organic solvent solution at a dry layer thickness of one to ten micrometers.

The temperature that the adhesive layer during lamination achieves is one of the notable parameters of the process. The interface temperature is dependant upon not only the roll temperature(s) but also the amount of wrap of the cover sheet 40 on roller 34, the diameter of roller 34, the thickness of cover sheet 40, and the speed of lamination, referring to FIG. 2. Typically a cover sheet wrap of approximately 150 degrees on a 5 cm diameter roller, using a cover sheet thickness of 50 micrometers, a lamination speed of 30 cm/minute, roller temperatures of 120-140° C. produced adequate adhesive activation.

Figure 13:
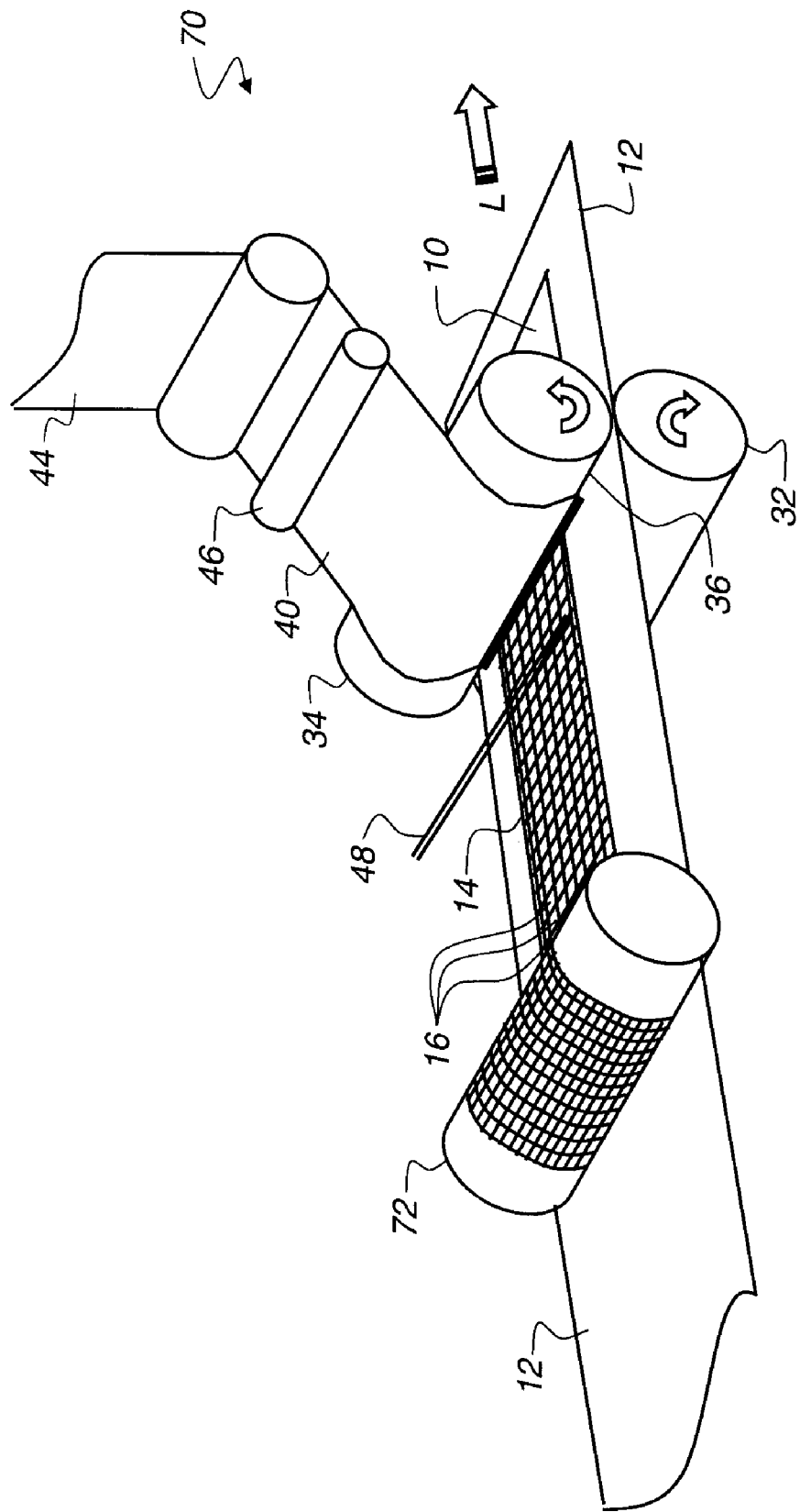
FIG. 13 is a perspective view of a roll-to-roll fabrication apparatus used in the present method.

Referring to FIG. 13, there is shown a continuous fabrication apparatus 70 for forming display devices 10, such as electrophoretic devices, using the methods of the present invention in a web manufacturing application. Raw support sheet 12 is fed from a roll or other continuous source to an embossing roller 72 for forming microcell reservoirs 16. Cover layer 44 for cover sheet 40 is fed from another roll or continuous source. An adhesive applicator 46 applies thin adhesive layer 42 shown in FIG. 3 to cover layer 44. A fluid supply 48 feeds a controlled stream of electro-optic imaging fluid 20 for filling microcell reservoirs 16 prior to nip 36.

Rollers 32 and 34, at least one of which is heated, then laminates cover sheet 40 onto support sheet 12.

It can be appreciated that the embodiment of FIG. 13 is illustrative of one example embodiment and that numerous alternate embodiments are possible for roll-to-roll fabrication, in which microcell array 14 is formed onto support sheet 12 as part of a continuous process. For example, an in-line photolithographic process could be used as an alternative, with microcell reservoirs 16 formed in a continuous fashion, upstream from nip 36 in this process. Electrodes could be formed onto one or both support sheet 12 and cover sheet 40 as these media are transported toward nip 36. Additional release layers could be added as part of in-line processing, to be removed following lamination or prior to installing and using the fabricated display devices 10.

Referring now to FIG. 14, a top view of a microcell sheet is shown in which the microcells in the array are oriented at an angle to the lamination direction. A blow-up of the microcell array in circular window 73 is also shown. This angle may improve the displacement of air and, therefore, be less prone to air entrapment. There may be less chance that air will be trapped because there is a smaller wall barrier as the fluid fills the microcells and displaces the air compared to a microcell sheet in which the entire row is perpendicular to the direction of lamination or the fluid bead.

The invention has been described with reference to a preferred embodiment. However, it will be appreciated that variations and modifications can be effected by a person of ordinary skill in the art without departing from the scope of the invention. Thus, what is provided is a particularly advantageous structure for an electro-optical modulating display and, independently, a method that may be used for fabrication of a variety of electro-optical modulating displays comprising an imaging fluid arranged in an array of sealed cells.

PARTS LIST 10 display device
12 support sheet
14 array
16 microcell reservoirs
18 wall
20 imaging fluid
22 electrode
24 sealing layer
26 absorbent sheet
28 boundary area
30 filling and sealing apparatus
32, 34 roller
36 nip
38 perimeter seal
40 cover sheet
42 adhesive layer
44 cover layer
46 adhesive applicator
48 fluid supply
50 bead
51 vias
52 electrophoretic display element
54 electrode
56 window
57 displaced electrodes
58 shim
60 sleeve
62 unused portion
64 defective cell
66 side surface
68 top surface
70 continuous fabrication apparatus
72 roller
73 circular window
h cell height
I inset
L lamination direction
W width direction
$w_c$ cell width

The invention claimed is:

1. A method of making an electro-optical modulating display device, or a manufacturing component thereof, comprising:

(a) providing a first elongated sheet, optionally a continuous web, comprising an array of microcell reservoirs, an outer width of which is in the same direction as outer width of the first elongated sheet, each microcell reservoir being no longer than 1000 µm along any dimension thereof, each microcell reservoir formed by side walls extending vertically from a lower substrate and containing an electro-optical imaging fluid that comprises charged particles dispersed in a carrier fluid, the first elongated sheet optionally comprising a boundary area between the outer width of the array of microcell reservoirs and the outer width of the first elongated sheet;

(b) providing a second elongated sheet, optionally a continuous web, comprising a substrate layer and an adhesive layer, wherein at least one of the first elongated sheet and second elongated sheet comprises patterned electrodes for addressing the microcell reservoirs in the array, which electrodes may be transparent;

(c) providing a nip formed between first and second rollers, wherein at least one of the first and second rollers is heated; and (d) laminating the first elongated sheet to the second elongated sheet by simultaneously transporting the first and second elongated sheets along their length in a lamination direction into the nip between the first and second rollers, wherein the second elongated sheet is positioned between the second roller and the first elongated sheet;

whereby the adhesive layer of the second elongated sheet is contacted with at least the tops of the side walls of the microcell reservoirs in the array, and the first elongated sheet is compressed against the second elongated sheet in said nip while the adhesive layer is held at an elevated temperature, thereby commonly sealing the microcell reservoirs in the array to form a sealed array of microcells;

wherein during lamination a bead of excess fluid, the electro-optical imaging fluid from the microcell reservoirs, is formed substantially in a line along the width of the array of microcells, between the first elongated sheet and the second elongated sheet, adjacent the nip and behind the nip relative to the lamination direction; and wherein the bead of excess fluid is allowed to flow widthwise beyond the boundary of the array of microcells in the first elongated sheet, thereby preventing the entrapment of air in the microcell reservoirs as they are sealed by the second elongated sheet during lamination.

2. The method of claim 1 wherein each of the microcell reservoirs is 200 to 600 µm along any dimension thereof and is symmetrical or non-symmetrical in plan view.

3. The method of claim 1 wherein each of the microcell reservoirs, in plan view, has a circular, rectangular, square, or hexagonal shape.

4. The method of claim 1 wherein each of the microcell reservoirs, in plan view, has a rectangular or square shape with side dimensional ratio of 1:1 to 1:5.

5. The method of claim 1 wherein the particles are colored, not excluding black and white, and are solid or liquid materials.

6. The method of claim 1 wherein the carrier fluid is transparent or colored organic dielectric fluid.

7. The method of claim 1 wherein the carrier fluid is an organic dielectric fluid having a long chain hydrocarbon or paraffin, optionally halogenated.

8. The method of claim 1 wherein the first and second rollers are both heated and at least one of the rollers are rotated during lamination to draw in the first and second elongated sheets.

9. The method of claim 1 wherein the second elongated sheet is introduced into the nip between the second roller and the first elongated sheet after transporting the second elongated sheet around the second roller with a wrap of 30 degrees or more.

10. The method of claim 9 wherein the second elongated sheet is introduced into the nip, between the second roller and the first elongated sheet, after transporting the second elongated sheet around the second roller with a wrap of between about 45 to 180 degrees.

11. The method of claim 1 wherein the first elongated sheet comprises, on each side of the array of microcell reservoirs and substantially in parallel, a boundary area between the outer width of the array of microcell reservoirs and the outer width of the first elongated sheet; and wherein the second elongated sheet entering the nip extends widthwise beyond the array of microcell reservoirs on both sides and within each boundary area of the first elongated sheet, and wherein side portions of the second elongated sheet are bonded to side portions of the first elongated sheet in the boundary areas, substantially simultaneously with the sealing of the array of microcell reservoirs during lamination.

12. The method of claim 11 wherein the first elongated sheet comprises the patterned electrodes and, within one or both boundary areas, contacts for the patterned electrodes, and wherein the width of the second elongated sheet does not extend as far as the contacts, wherein, when the side portions of the second elongated sheet are bonded to the first elongated sheet in the boundary areas during lamination, the contacts are left uncovered by the second elongated sheet.

13. The method of claim 11 wherein side edges of the second elongated sheet are substantially coterminal with side edges of the first elongated sheet widthwise.

14. The method of claim 13 wherein the first elongated sheet comprises the patterned electrodes and, within at least one of the boundary areas, contacts for the patterned electrodes, and wherein the width of the second elongated sheet extends beyond the contacts but that windows are formed in the second elongated sheet, before or after lamination, so that when the side portions of the second elongated sheet are bonded to the side portions of the first elongated sheet in the boundary areas during lamination, the contacts are located within the windows and, therefore, remain uncovered by the second elongated sheet.

15. The method of claim 11 wherein, after sealing the microcell reservoirs and bonding together side portions of the first and second elongated sheets, a perimeter seal is formed by bonding transverse portions of the first and second elongated sheets, before and after the microcell array on the elongated first sheet, thereby completely enclosing the entire microcell array in a sealed line between the first and second elongated sheets.

16. The method of claim 1 wherein a side portion of unfilled microcell reservoirs are located adjacent to the array of microcell reservoirs, on each widthwise side of the microcell array, whereby the unfilled microcell reservoirs are not covered by the elongated second sheet during lamination, wherein the side portion of unfilled microcell reservoirs each comprises one or more rows of the microcell reservoirs, thereby providing side gutter for excess electro-optical imaging fluid.

17. The method of claim 16 wherein a radial sleeve surrounds the second roller and is of lesser width than the second roller such that the portion of the second roller not surrounded by the radial sleeve does not contact the side portions of unfilled microcell reservoirs during lamination of the second elongated sheet to the first elongated sheet.

18. The method of claim 16 wherein a shim is interposed between the second roller and the second elongated sheet over the top surface of the array of microcell reservoirs being sealed, wherein the shim defines the area over which pressure is applied by the first and second roller for lamination and leaves the side portions of unfilled microcell reservoirs uncompressed by the first and second rollers during lamination.

19. The method of claim 18 wherein the shim is wrapped around the second roller and extends widthwise less than the width of the second roller and less than the width of the first elongated sheet, and at least the width of the second elongated sheet, such that during lamination the excess fluid is allowed to escape sidewise along the bead line of excess fluid into at least one row of unfilled microcell reservoirs along the sides of the array of microcell reservoirs being sealed.

20. The method of claim 1 wherein an absorbent layer of material is wrapped around the first roller and is capable of absorbing any excess fluid that escapes from the array of microcell reservoirs being sealed and reaches the absorbent layer.

21. The method of claim 1 wherein the array of microcell reservoirs in the first elongated sheet is filled with electro-optical imaging fluid upstream of the nip at a preselected distance.

22. The method of claim 21 wherein the electro-optical imaging fluid is applied to the array of microcell reservoirs in the first sheet by hopper coating, curtain coating, or by inkjet head.

23. The method of claim 1 wherein an adhesive is applied to a substrate layer of the second elongated sheet upstream of the nip at a preselected distance.

24. The method of claim 1 wherein the second elongated sheet is sufficiently flexible and compliant and less than 75 micrometers in thickness such that concave deformation of the second elongated sheet into the tops of the cells causes excess fluid in the microcell reservoirs to be displaced from the microcell reservoirs.

25. The method of claim 1 wherein lamination between the first and second rollers is carried out at a temperature between about 100 and 140° C., and pressure applied at the nip is in the range of about 50 to 200 kiloPascals.

26. An electro-optical modulating display comprising an array of microcells each sealingly filled with an electro-optical imaging fluid, comprising:
(a) a first sheet comprising an array of microcell reservoirs, each microcell reservoir being no longer than 1000 µm along any dimension thereof, each microcell reservoir formed by side walls extending vertically from a lower substrate and containing an electro-optical imaging fluid that comprises charged particles dispersed in a carrier fluid, wherein the microcell reservoirs in the array extend along two dimensions, with a boundary area peripheral to the array of microcell reservoirs, on at least two sides, between a first outer dimension of the array of microcells and a second outer dimension of the first sheet, the first sheet further comprising at least one patterned element having optical or electrical functionality associated with individual microcell reservoirs of the array;
- (b) an integral second sheet laminated to the first sheet and comprising an adhesive layer over a support, the integral second sheet simultaneously:
  - (i) sealing each of the microcell reservoirs in the array, in which the adhesive layer adhesively bonds to the tops of the side walls of each microcell reservoir in the array, thereby forming an array of microcells, each of which is sealed; and
  - (ii) sealing side portions of the second sheet to side portions of the first sheet within the boundary area of the first sheet;
- (c) an electrical driver for providing control of electrical switching of the optical state of the electro-optical fluid in each microcell in the array of microcells.

27. The electro-optical modulating display of claim 26 wherein the patterned element having optical or electrical functionality associated with individual microcells of the array provides a functionality selected from the group comprising a mask designed to hide particles in the electro-optical fluid, bus bars, collector electrodes, gate electrodes, flag electrodes, electrode pad areas, and combinations thereof.

28. The electro-optical modulating display of claim 26 wherein the patterned element is positioned in regions all or partially under the array of microcell reservoirs of the first sheet.

29. The electro-optical modulating display of claim 26 wherein the patterned element comprises patterned electrodes and, within each boundary area, contacts for the patterned electrodes, and wherein the side edges of the second sheet do not extend as far as the contacts, so that the contacts are left uncovered by the second sheet.

30. The electro-optical modulating display of claim 26 wherein the first sheet and the second sheet, in plan view, are coterminal along at least one dimension in plan view.

31. The electro-optical modulating display of claim 30 wherein the patterned element comprises patterned electrodes and, within each boundary area, contacts for the patterned electrodes, and wherein side edges of the second sheet extend beyond the contacts but that windows formed in the second sheet leave the contacts uncovered by the second sheet.

32. The electro-optical modulation display of claim 26 wherein a perimeter seal is formed between the first sheet and second sheet that completely encloses the entire microcell array in a sealed line between the first and second sheets, the sheets being integral and unitary materials.

33. The electro-optical modulating display of claim 32 wherein non-functional (non-electrically addressed) electro-optical imaging fluid is present outside the microcell array in the space bounded by the first sheet, the second sheet, outer boundary of the microcell array, and the sealed perimeter seal.

34. An electro-optical modulating display comprising an array of microcells each sealingly filled with an electro-optical imaging fluid:
- (a) a first sheet comprising an array of microcell reservoirs, each microcell reservoir being no longer than 1000 μm along any dimension thereof, each microcell reservoir formed by side walls extending vertically from a lower substrate and containing an electro-optical imaging fluid that comprises charged particles dispersed in a carrier fluid that is a transparent or colored organic dielectric fluid comprising a long chain hydrocarbon or paraffin, optionally halogenated, the first sheet further comprising at least one patterned element having optical or electrical functionality associated with individual microcell reservoirs of the array;
- (b) an integral second sheet laminated to the first sheet and comprising an adhesive layer over a support, the integral second sheet sealing each of the filled microcell reservoirs in the array, in which the adhesive layer adhesively bonds to the tops of the side walls of each microcell reservoir in the array, wherein the adhesive layer comprises a non-ionic polymeric adhesive material that is substantially insoluble in the organic dielectric fluid and will adhere to the top surface of the sidewalls, of the filled microcell reservoirs, in either the dry state or when wet with the organic dielectric fluid; and
- (c) an electrical driver for providing control of electrical switching of the optical state of the electro-optical fluid in each microcell reservoir in the array.

35. The electro-optical modulating display of claim 34 wherein the adhesive material is a polyester-type thermoplastic polyurethane (TPU) at a thickness of 5 to 25 micrometers.

36. The electro-optical modulating display of claim 34 wherein the adhesive material is amorphous or semi-crystalline copolyester resin having a glass transition temperature of less than −10° C. or a tensile strength of less than three megaPascals and an elongation, to break, of greater than 1000 percent.

37. The electro-optical modulating display of claim 34 wherein the support for the adhesive layer in the integral second sheet comprises polyethylene terephthalate.

38. The electro-optical modulating display of claim 37 wherein the polyethylene terephthalate support is optically reflective in nature such that the percent of visible light reflection, in the range of 400-800 nm, is greater than 80%.

39. The electro-optical modulating display of claim 37 wherein the polyethylene terephthalate support is white.

40. The electro-optical modulating display of claim 39 wherein the polyethylene terephthalate support has a thickness of between 5 and 100 microns.

41. The electro-optical modulating display of claim 34 wherein the adhesive material further comprises a white pigment.

42. The electro-optical modulating display of claim 34 wherein the side walls of the microcell reservoirs are made from an epoxide photoresist material.

\* \* \* \* \*

UNITED STATES PATENT AND TRADEMARK OFFICE
CERTIFICATE OF CORRECTION

PATENT NO. : 7,324,264 B2  
APPLICATION NO. : 11/360902  
DATED : January 29, 2008  
INVENTOR(S) : Peter Thomas Aylward Page 1 of 1

It is certified that error appears in the above-identified patent and that said Letters Patent is hereby corrected as shown below:

|  | Line | Description of Error |
| --- | --- | --- |
| Title Page Item (54) Title | 2 | Delete "DISPLAY" and insert --DISPAYS--. |
| Col. 1 Title | 2 | Delete "DISPLAY" and insert --DISPAYS--. |
| Col. 22 | 56 | In Claim 1, delete "microcells," and insert --microcell reservoirs,--. |
| Col. 22 | 61-62 | In Claim 1, delete "microcells," and insert --microcell reservoirs,--. |

Signed and Sealed this

Fifth Day of October, 2010

David J. Kappos  
*Director of the United States Patent and Trademark Office*